US012562990B2

(12) United States Patent
Edwards et al.

(10) Patent No.: US 12,562,990 B2
(45) Date of Patent: Feb. 24, 2026

(54) CAPACITY TRACKING AND FORECAST MODELING ACROSS MULTIPLE PLATFORMS

(71) Applicant: MASTERCARD INTERNATIONAL INCORPORATED, Purchase, NY (US)

(72) Inventors: David Scott Edwards, Fenton, MO (US); Gina O'Donnell, St. Charles, MO (US); Harry Wayne Allen, Oakville, MO (US); Nicholas Koehler, St. Peters, MO (US); Ted Christopher Boehm, Lake St Louis, MO (US); Thomas Wurm, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 140 days.

(21) Appl. No.: 18/340,829

(22) Filed: Jun. 23, 2023

(65) Prior Publication Data

US 2024/0430201 A1    Dec. 26, 2024

(51) Int. Cl.
*G06F 15/173* (2006.01)
*H04L 41/147* (2022.01)
*H04L 47/12* (2022.01)

(52) U.S. Cl.
CPC ............ *H04L 47/12* (2013.01); *H04L 41/147* (2013.01)

(58) Field of Classification Search
CPC ............................... H04L 47/12; H04L 41/147
See application file for complete search history.

(56) References Cited

U.S. PATENT DOCUMENTS

| | | | |
|---|---|---|---|
| 11,860,760 B1 * | 1/2024 | Agarwal | ................. G06F 16/00 |
| 2008/0244606 A1 | 10/2008 | Wylie et al. | |
| 2021/0073680 A1 | 3/2021 | Garvey et al. | |
| 2021/0136095 A1 | 5/2021 | Dinh et al. | |
| 2022/0036259 A1 * | 2/2022 | Bird | ........................ G06Q 10/04 |
| 2022/0245485 A1 * | 8/2022 | Cady | ........................ G06N 5/04 |
| 2022/0247693 A1 | 8/2022 | Wu et al. | |

FOREIGN PATENT DOCUMENTS

CN        114840441 A    8/2022

OTHER PUBLICATIONS

Ricardo José Pfitscher, "Monitoring and Identifying Bottlenecks in Virtual Network Functions Service Chains," Universidade Federal Do Rio Grande Do Sul Instituto De Informática Programa De Pós-Graduação Em Compução:122 pages (Jan. 2019).

* cited by examiner

*Primary Examiner* — Padma Mundur
(74) *Attorney, Agent, or Firm* — Barta Jones, PLLC

(57) ABSTRACT

Systems and methods track capacity and model forecasts across multiple platforms. A flow of data traffic from a first device to a second device is monitored. A future flow of data traffic is forecast based on the monitored flow, the future flow of data traffic including additional data traffic in addition to the monitored flow of data traffic. A threshold is anticipated to be reached in the forecasted future flow of data traffic. A corrective action is determined to mitigate the anticipated threshold being reached and then implemented.

20 Claims, 13 Drawing Sheets

200

600

| Components--> | APIGW Load Balancer | APIGW | DMZ2 FW | App Load Balancer | App | DMZ3 FW | Database Load Balancer | Database | Cache Load Balancer |
|---|---|---|---|---|---|---|---|---|---|
| Hits per use case | 1 | 1 | 1 | 1 | 1 | 10 | 5 | 5 | 1 |
| Future/Modeled TPS | 100 | 100 | 100 | 100 | 100 | 1,000 | 500 | 500 | 100 |
| Current Peak Usage TPS | 8,000 | 8,000 | 14,000 | 3,000 | 50 | 19,000 | 15,000 | 5,000 | 500 |
| Peak Capacity TPS | 50,000 | 10,000 | 20,000 | 50,000 | 90 | 20,000 | 50,000 | 7,000 | 50,000 |
| TPS Headroom | 41,900 | 1,900 | 5,900 | 46,900 | (60) | 0 | 34,500 | 1,500 | 49,400 |
| Percent Capacity Used | 16% | 81% | 71% | 6% | 167% | 100% | 31% | 79% | 1% |

| | Cache | DMZ4 FW | Backend Service Load Balancer | Backend Service |
|---|---|---|---|---|
| | 1 | 4 | 4 | 4 |
| | 100 | 400 | 400 | 400 |
| | 300 | 9,000 | 4,000 | 4,000 |
| | 500 | 9,200 | 50,000 | 4,200 |
| | 100 | (200) | 45,600 | (200) |
| | 1% | 102% | 9% | 105% |

800

902

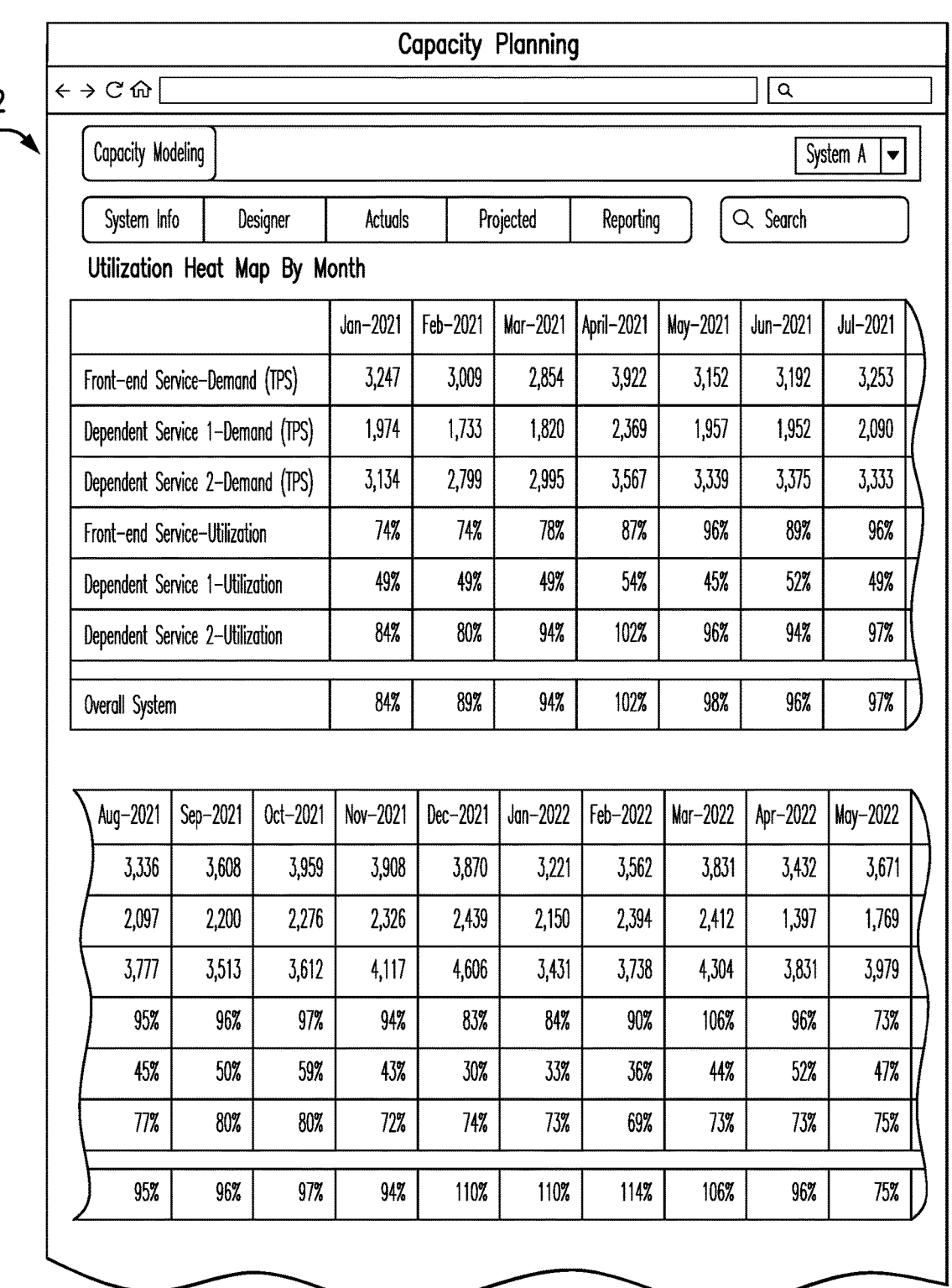

Capacity Planning

Capacity Modeling                                                    System A ▼

System Info | Designer | Actuals | Projected | Reporting | 🔍 Search

Utilization Heat Map By Month

| | Jan-2021 | Feb-2021 | Mar-2021 | April-2021 | May-2021 | Jun-2021 | Jul-2021 |
|---|---|---|---|---|---|---|---|
| Front-end Service-Demand (TPS) | 3,247 | 3,009 | 2,854 | 3,922 | 3,152 | 3,192 | 3,253 |
| Dependent Service 1-Demand (TPS) | 1,974 | 1,733 | 1,820 | 2,369 | 1,957 | 1,952 | 2,090 |
| Dependent Service 2-Demand (TPS) | 3,134 | 2,799 | 2,995 | 3,567 | 3,339 | 3,375 | 3,333 |
| Front-end Service-Utilization | 74% | 74% | 78% | 87% | 96% | 89% | 96% |
| Dependent Service 1-Utilization | 49% | 49% | 49% | 54% | 45% | 52% | 49% |
| Dependent Service 2-Utilization | 84% | 80% | 94% | 102% | 96% | 94% | 97% |
| Overall System | 84% | 89% | 94% | 102% | 98% | 96% | 97% |

| Aug-2021 | Sep-2021 | Oct-2021 | Nov-2021 | Dec-2021 | Jan-2022 | Feb-2022 | Mar-2022 | Apr-2022 | May-2022 |
|---|---|---|---|---|---|---|---|---|---|
| 3,336 | 3,608 | 3,959 | 3,908 | 3,870 | 3,221 | 3,562 | 3,831 | 3,432 | 3,671 |
| 2,097 | 2,200 | 2,276 | 2,326 | 2,439 | 2,150 | 2,394 | 2,412 | 1,397 | 1,769 |
| 3,777 | 3,513 | 3,612 | 4,117 | 4,606 | 3,431 | 3,738 | 4,304 | 3,831 | 3,979 |
| 95% | 96% | 97% | 94% | 83% | 84% | 90% | 106% | 96% | 73% |
| 45% | 50% | 59% | 43% | 30% | 33% | 36% | 44% | 52% | 47% |
| 77% | 80% | 80% | 72% | 74% | 73% | 69% | 73% | 73% | 75% |
| 95% | 96% | 97% | 94% | 110% | 110% | 114% | 106% | 96% | 75% |

FIG. 9A

| Jun-2022 | Jul-2022 | Aug-2022 | Sep-2022 | Oct-2022 | Nov-2022 | Dec-2022 |
|---|---|---|---|---|---|---|
| 3,737 | 3,980 | 3,830 | 4,007 | 4,098 | 4,590 | 4,958 |
| 1,683 | 1,638 | 1,649 | 1,660 | 1,698 | 1,902 | 2,055 |
| 4,081 | 4,262 | 4,313 | 4,286 | 4,383 | 4,909 | 5,302 |
| 70% | 75% | 73% | 75% | 77% | 86% | 93% |
| 48% | 39% | 46% | 43% | 44% | 49% | 53% |
| 75% | 78% | 76% | 78% | 80% | 90% | 97% |
| 75% | 87% | 85% | 93% | 80% | 90% | 97% |

MEMORY 1112

DATA 1112a

INSTRUCTIONS 1112b

PROCESSOR(S) 1114

PRESENTATION COMPONENT(S) 1116

NETWORK COMPONENT 1124

I/O PORT(S) 1118

I/O COMPONENTS 1120

POWER SUPPLY 1122

1110

1126a

1126

1130 NETWORK

1128

CAPACITY TRACKING AND FORECAST MODELING ACROSS MULTIPLE PLATFORMS

BACKGROUND

Capacity modeling measures resource and capacity usage in a flow of data traffic, such as in response to a request being received. Upon receipt of a request, such as a request to call an application, data flows through a system that may include firewalls, application programming interfaces (APIs), load balancers, and so forth before reaching the application container that processes the request. The response to the request also follows a path through the system before ultimately returning to the interface where the request was initially made. Because the data traffic may not be linear, and reaching one or more of the firewalls, APIs, load balancers, and so forth may trigger additional requests that further expand the data flow; monitoring the data flow and forecasting future resource and capacity usage is difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various implementations of the present disclosure described herein are directed to systems and methods for capacity tracking and forecast modeling across multiple platforms. The method includes monitoring a flow of data traffic from a first device to a second device: forecasting a future flow of data traffic based on the monitored flow, the future flow of data traffic including additional data traffic in addition to the monitored flow of data traffic: anticipating that a threshold is to be reached in the forecasted future flow of data traffic: determining a corrective action to mitigate the anticipated threshold being reached; and generating the determined corrective action, the generated corrective action proactively preventing the anticipated threshold from being reached.

In another implementation, a system for capacity tracking and forecast modeling across multiple platforms is provided. The system includes a processor, a memory communicatively coupled to the processor, and a capacity modeler implemented on the processor. The capacity modeler monitors a flow of data traffic from a first device to a second device: forecasts a future flow of data traffic based on the monitored flow, the future flow of data traffic including additional data traffic in addition to the monitored flow of data traffic: anticipates that a threshold is to be reached in the forecasted future flow of data traffic: determines a corrective action to mitigate the anticipated threshold being reached; and generates the determined corrective action, the generated corrective action proactively preventing the anticipated threshold from being reached.

In another implementation, a computer readable medium stores instructions for capacity tracking and forecast modeling across multiple platforms. The instructions, when executed by a processor, cause the processor to monitor a flow of data traffic from a first device to a second device: forecast a future flow of data traffic based on the monitored flow, the future flow of data traffic including additional data traffic in addition to the monitored flow of data traffic: anticipate that a threshold is to be reached in the forecasted future flow of data traffic: determine a corrective action to mitigate the anticipated threshold being reached; and generate the determined corrective action, the generated corrective action proactively preventing the anticipated threshold from being reached.

BRIEF DESCRIPTION OF THE DRAWINGS

The present description will be better understood from the following detailed description read in light of the accompanying drawings, wherein:

FIGS. 9A-9B are examples of a UI presenting a utilization heat map by month and utilization chart by month:

Corresponding reference characters indicate corresponding parts throughout the drawings. In FIGS. 1 to 11, the systems are illustrated as schematic drawings. The drawings may not be to scale. Any of the figures may be combined into a single example or embodiment.

DETAILED DESCRIPTION

Figure 1:
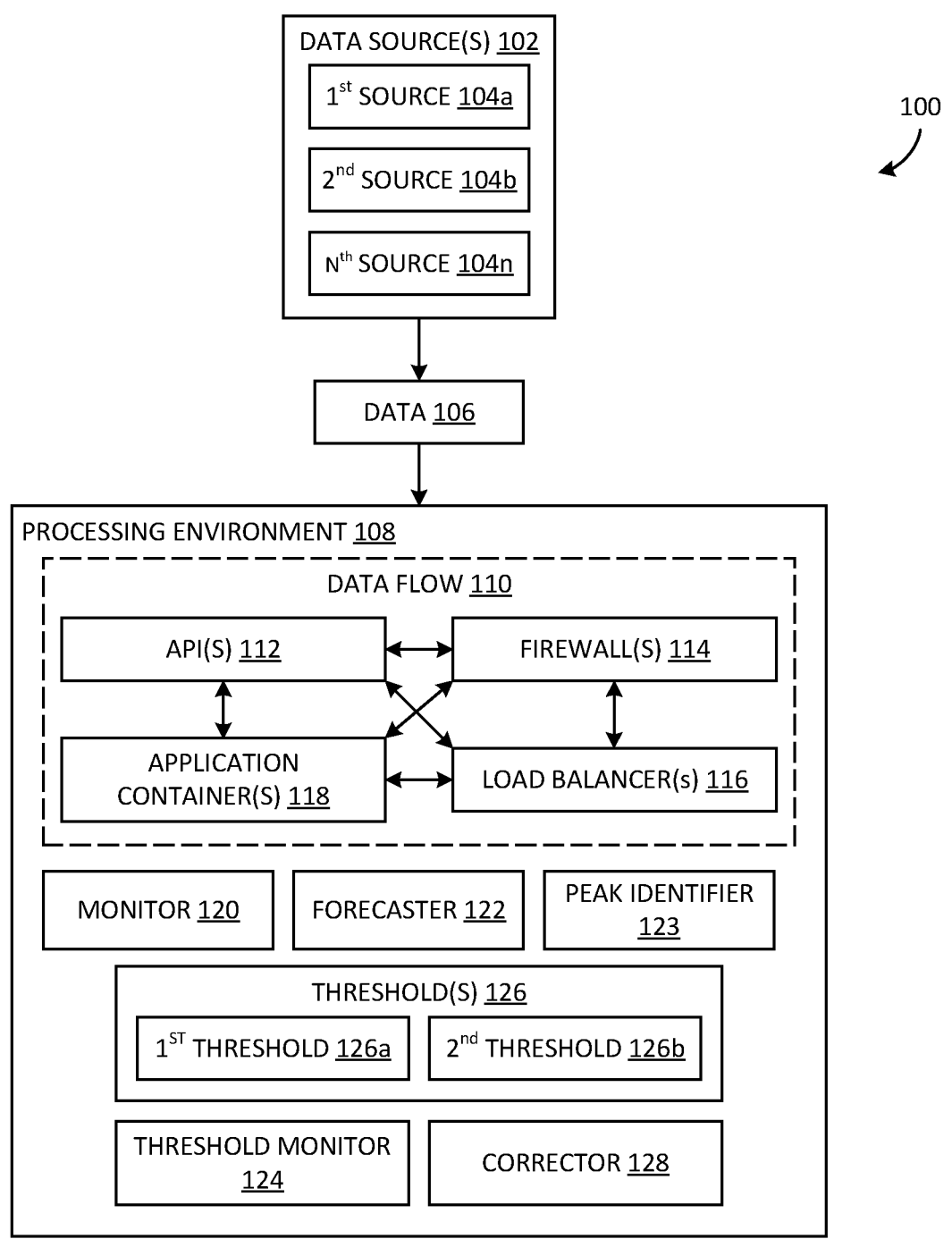
FIG. 1 illustrates an example system for capacity tracking and forecast modeling across multiple platforms.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Data traffic is monitored in order to ensure sufficient resources and capacity to service incoming requests from multiple sources. In some examples, the resources and capacity required to process incoming requests includes central processing units (CPUs), memory, network bandwidth, and so forth. Upon receipt of a request, such as a request to call an application, data flows through a system that may include firewalls, application programming interfaces (APIs), load balancers, and so forth before reaching an application container that processes the request. The response to the request also follows a path through the system before ultimately returning to the interface where the request was initially made.

Tracking the flow of data traffic is critical to accurately forecasting future usage and capacity of a system in order to maintain or improve performance of the system, prevent capacity thresholds from being exceeded, which stress the system, and so forth. Current solutions of forecasting rely on static percentage increases of resource and capacity usage over large periods of time, such as per month, per quarter, per year, and so forth. However, these solutions fail to provide robust and accurate forecasting for several reasons. As the systems themselves become more sophisticated and workloads are moved to more scalable solutions, such as virtual machines (VMs) and public or private clouds, standard capacity monitoring metrics are unable to keep up with application concurrency throughout the transaction journey. In addition, many fixed capacity systems or appliances, such as firewalls and shared service gateway appliances, reside in the communication path, which are often not considered in conventional forecasting solutions due to being proprietary or otherwise unavailable. This makes monitoring shared services difficult because the shared services are consumed by many applications. Even when the sudden growth of a single application is validated in isolation but in practice, the growth may impact other applications sharing the service if the shared service is unable to handle the surge in traffic. In another example, database row count growth may impact one or both of performance capacity or storage needs. As the transaction volume increases, the likelihood of a bottleneck in the data traffic of a transaction increases as well. The flow of data traffic often requires downstream dependency invocations to respond to the request, which may be called either synchronously or asynchronously to satisfy the request. Finally, because the current solutions fail to sufficiently forecast capacity usage, actions taken to address challenges are reactive. In other words, once a bottleneck or outage is detected, a reactive action is taken to rectify the issue.

Accordingly, the systems provided in the present disclosure provide a technical solution to an inherently technical problem by enabling resource and capacity forecasting to proactively anticipate when a threshold is likely to be reached and proactively generate a corrective action to prevent the threshold from being reached. Aspects of the disclosure robustly and proactively forecast capacity and usage to prevent possible bottlenecks or outages before they would otherwise occur. For example, the present disclosure provides a capacity modeler that maps data traffic to future data journeys, uses the mapping to model future capacity usage, anticipates one or more thresholds being reached or approached based on the future capacity usage, and proactively, or preemptively, generates a corrective action to prevent the thresholds from being reached. Thus, the capacity modeler provides enhanced reliability, uses less memory and provides improved memory management, uses less computing processing resources and provides improved computing processing management, improved system resource allocation and management, and reduced network bandwidth usage for the system implementing the capacity modeler by proactively stabilizing the system through generating proactive corrective measures. In some examples, the corrective measures, or actions, generated by the capacity modeler include rate limiting in the system during anticipated high traffic times, throttling processing speed, scaling capacity in advance of anticipated high traffic times, changing one or more request paths to reallocate processing resources, generating recommended holds on a cause of the threshold being reached, and so forth.

The systems and methods of the present disclosure operate in an unconventional manner at least by providing an unconventional solution to the challenge of stabilizing computing systems, particularly during times of surges in data traffic, by dynamically modeling and forecasting resource and capacity to proactively generate a corrective action that stabilizes the system. While current solutions are reactive to real-time bottlenecks or outages and use previous production to forecast future usage, the capacity modeler presented herein instead generates a forecast based on how current iterations of traffic requests are processed and extrapolating these paths to anticipated usage in the future.

FIG. 1 illustrates an example system for capacity tracking and forecast modeling across multiple platforms. The system 100 illustrated in FIG. 1 is provided for illustration only. Other examples of the system 100 can be used without departing from the scope of the present disclosure.

The system 100 includes one or more data sources 102 and a processing environment 108. The data sources 102 include a first source 104a, a second source 104b, and an nth source 104n. Although illustrated herein as three sources 104, it should be understood that any number of sources 104 may be used without departing from the scope of the present disclosure. In some examples, each of the first source 104a, the second source 104b, and the nth source 104n is a computing device connected to a network also connected to the processing environment 108. Thus, the processing environment 108 receives and processes data 106 generated by the data source 102. In some examples, each of the first source 104a, the second source 104b, and the nth source 104n is a component of a device that also includes the processing environment 108. In other words, the data source 102 and the processing environment may be separate devices or included as separate components of a single device without departing from the scope of the present disclosure.

The data source 102 generates data 106 that is processed in the processing environment 108. For example, the processing environment 108 includes various components, including application programming interfaces (APIs) 112, firewalls 114, load balancers 116, and application containers 118, that process the data 106. The data 106 is processed through a data flow 110 that includes the components including the APIs 112, firewalls 114, load balancer 116, and application containers 118. In some examples, an example data flow 110 for data 106 includes at least one API 112, at least one firewall 114, at least one load balancer 116, and at least one application container 118. In some examples, another example data flow 110 includes some, but not all, of an API 112, firewall 114, load balancer 116, and application container 118. For example, a particular request including an example of data 106 may flow through an API 112, a load balancer 116, and an application container 118, but not flow through a firewall 114. Additional details regarding data traffic through an example of the data flow 110 are described in greater detail below with regards to FIG. 5.

In some examples, the API 112 is an API gateway. In some examples, the API 112 is a shared API gateway. In some examples, more than one API 112 is included in the data flow 110. In other words, the data 106 may traverse more than one API 112 in a single data flow 110.

The firewall 114 is a physical firewall in some examples, such as a shared physical firewall. In some examples, the firewall 114 is a demilitarized zone (DMZ) firewall. In some examples, more than one firewall 114 is included in the data flow 110. In other words, the data 106 may traverse more than one firewall 114 in a single data flow 110.

In some examples, the load balancer 116 is a physical load balancer. For example, the load balancer 116 may be a shared physical API gateway load balancer, a physical load balancer, a database load balancer, and so forth. In some examples, more than one load balancer 116 is included in the data flow 110. In other words, the data 106 may traverse more than one load balancer 116 in a single data flow 110.

An example application container 118 is a container that executes a particular application. In some examples, more than one application container 118 is included in the data flow 110. In other words, the data 106 may traverse more than application container 118 in a single data flow 110.

The processing environment 108 further includes a monitor 120, a forecaster 122, a peak identifier 123, a threshold monitor 124, and a corrector 128. The monitor 120 monitors the data 106 as the data 106 progresses through the data flow 110 to determine the number of invocations, or calls, of additional components that are performed by the particular data 106. For example, where a request is received to process a payment for an item, the data 106 may include transaction details, including the purchaser, seller, transaction amount, a time stamp, product details that were purchased, and so forth, as well as details regarding the request so that the proper components are called to process the request. The data 106 progresses through the data flow 110 through, for example, an API 112, a firewall 114, a load balancer 116, and ultimately to an application container 118 that processes the transaction based on the data 106 in the request. As the data 106 progresses through the data flow 110, the monitor 120 monitors, or tracks, each invocation of the API 112, firewall 114, load balancer 116, and application container 118 made after receiving the request. In some examples, the execution by the application container 118 triggers another set of invocations of the API 112, firewall 114, and load balancer 116 through the data flow 110 in order to provide a response to the received request.

Figure 6:
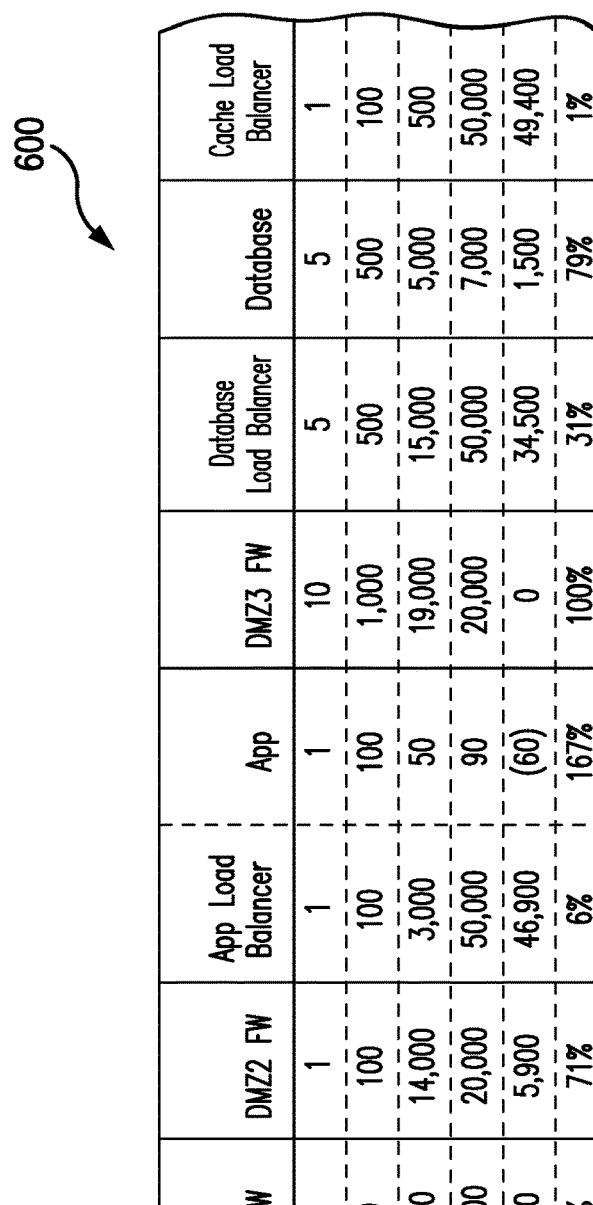
FIG. 6 is an example table showing component usage for the request and expected component usage for additional requests.

In some examples, the monitor 120 generates and maintains a log of calls executed within a single data flow 110 per request. An example of a log is illustrated in FIG. 6. In some examples, the log is expressed as a table, including rows and columns, where each row corresponds to a single request and each column in the row identifies the number of calls to a particular component in execution of the request. As shown in FIG. 6 below, some components may be called more than once in response to a single request. For example, in the example illustrated in FIG. 6, in a single use case, i.e., to service a single request, a DMZ4 firewall is called ten times.

The forecaster 122 forecasts future resource usage and corresponding available capacity. For example, the forecaster 122 uses the log generated and maintained by the monitor 120 to forecast the future resource usage and available capacity when data traffic is increased.

For example, the log illustrated in FIG. 6 illustrates forecasted future usage of different components when the data traffic is increased by a scale of one hundred transactions per second (TPS). However, it should be understood that the forecaster 122 forecasts future resource usage and corresponding available capacity on any scale without departing from the scope of the present disclosure. The forecaster 122 may forecast the future usage of different components when increased by a scale of ten TPS, fifty TPS, 200 TPS, or any other scale.

In various examples, the forecaster 122 forecasts future resource usage for different scenarios. In some examples, the forecaster 122 forecasts future resource usage at a constant rate, such as current usage increased by a particular scale. In some examples, the forecaster 122 forecasts future resource usage for a particular day. For example, the forecaster 122 may forecast future resource usage for a particularly high volume shopping day, where a peak in activity is expected on a particular day where multiple retail establishments implement sales, such as Black Friday. In some examples, the forecaster 122 forecasts future resource usage for a particular set of days. For example, the forecaster 122 may forecast future resource usage for a stretch of higher volume shopping days, such as the first three weeks in December. Rather than a single peak as on Black Friday, the first three weeks in December may be forecast as a gradual but significant increase in volume up through December 25, with a significant drop off after December 25. In another example, the forecaster 122 forecasts future resource usage based on a known product launch. For example, when a particular electronic device, gaming device, movie, event, and so forth is anticipated to be released on a particular day, the forecaster 122 may forecast resource usage that processes payments for the product to be launched, traffic for a web address to view or purchase the product, and so forth.

In some examples, the forecaster 122 forecasts different types of resource usage. For example, the forecaster 122 may forecast significant transaction activity for new transactions during the first three weeks in December and then a transition to processing refunds in the week after December 25 to account for returns and/or exchanges of gifts after the holiday season.

In some examples, the forecaster 122 updates the log maintained by the monitor 120 with new data identifying a future or modeled number of calls for each respective component based on the scaled TPS levels. For example, the forecaster 122 updates the log by adding a new row identifying the number of calls for each respective component in the data flow 110 when the model is forecasted to be increased by a particular scale.

The peak identifier 123 determines peak capacity usage for each respective component in the data flow 110. In some examples, the peak identifier 123 determines current peak usage and peak capacity. Current peak usage refers to actual peak usage that has been observed on each component within a lookback window, such as one week, two weeks, thirty days, sixty days, and so forth. The current peak usage is a measure of the most usage that has been actually observed within the lookback window. The peak capacity is an upper limit of known capacity of the component.

In some examples, the peak capacity is determined and/or validated by performance testing. For example, the peak identifier 123 performs performance testing to identify peak capacity, load, stress, capacity, soak, and break point performance test types used in coordination with each other to identify upper limits under certain scenarios. For example, in spike, or peak, testing, sudden increases or decreases in a load are generated to identify what happens in that situation. In breakpoint testing, test velocity is continually increased until failure is determined. In soak testing, a load is generated over a for a long duration, or period of time, such as greater than twenty-four hours, to determine the result of high loads on the system for a long length of time. In some examples, more than one different type of test is executed at a time in order to provide more robust testing of the system and to more accurately identify different problem points.

In some examples, the peak identifier 123 updates the log maintained by the monitor 120 with the determined current peak usage and determined peak capacity. The peak identifier 123 updates the log by adding a new row to the log with the current peak usage for each respective component and a new row with the peak capacity for each respective capacity.

In some examples, as an aspect of maintaining the log, the monitor 120 calculates available resources for each respective component based on the peak capacity determined by the peak identifier 123, the actual peak usage determined by the peak identifier 123, and the forecasted resource usage forecasted by the forecaster 122. For example, available resources for each respective component are defined as peak capacity minus current peak usage minus forecasted usage. In some examples, the monitor 120 further calculates a percentage of the capacity forecast to be used by each respective component. The capacity forecast is calculated as the modeled resource usage plus the current peak usage, divided by the peak capacity. The monitor 120 adds each of the available resources and the capacity forecast to the log as new rows.

The threshold monitor 124 monitors one or more thresholds 126 for each component listed in the generated log. In some examples, each respective component, e.g., each API 112, firewall 114, load balancer 116, and application container 118, has at least a first threshold 126*a* and a second threshold 126*b* that is monitored by the threshold monitor 124. The first threshold 126*a* is referred to as a warning threshold and indicates a percentage of the available resources for the respective component anticipated to be utilized based on the forecasted model by the forecaster 122 where a corrective action may be beneficial, but where the percentage of available resources is not yet at a critical level. The first threshold 126*a* may be set at fifty percent, sixty percent, seventy percent, seventy-five percent, eighty percent, and so forth. In some examples, each respective component has more than one warning threshold, such as a first warning threshold at sixty percent capacity and a second warning threshold at seventy-five percent capacity. In some examples, each respective component has one warning threshold, such as a threshold at seventy-five percent capacity. The second threshold 126*b* is referred to as a critical threshold and, when anticipated to be reached, indicates anticipated resource usage greater than the calculated peak capacity for the respective component. In other words, the second threshold 126*b* may be set at one hundred percent, such that the second threshold 126*b* is reached when the anticipated resource usage is greater than one hundred percent of the available resources.

Upon determining that a first threshold 126*a* or a second threshold 126*b* for a particular component is reached, the threshold monitor 124 issues an alert to trigger a corrective action that prevents the critical threshold from being reached. The corrective action is generated and controlled to be applied by the corrector 128. In some examples, the corrective action includes throttling, or limiting, the rate at which the data flow 110 progresses, throttling the processing power allocated to the respective components, scaling the available capacity to increase the capacity of the respective component, changing a request path, i.e., the data flow 110 among the respective components, delaying the launch of a new product or service that would other cause the first threshold 126*a* or second threshold 126*b* to be reached, and so forth. In some examples, the corrective action is a notification that is transmitted or presented to take a corrective action. For example, the corrective action may be a request that the cause of the critical threshold 126*b* being reached be held, such as postponing the launch of a particular product.

Figure 2:
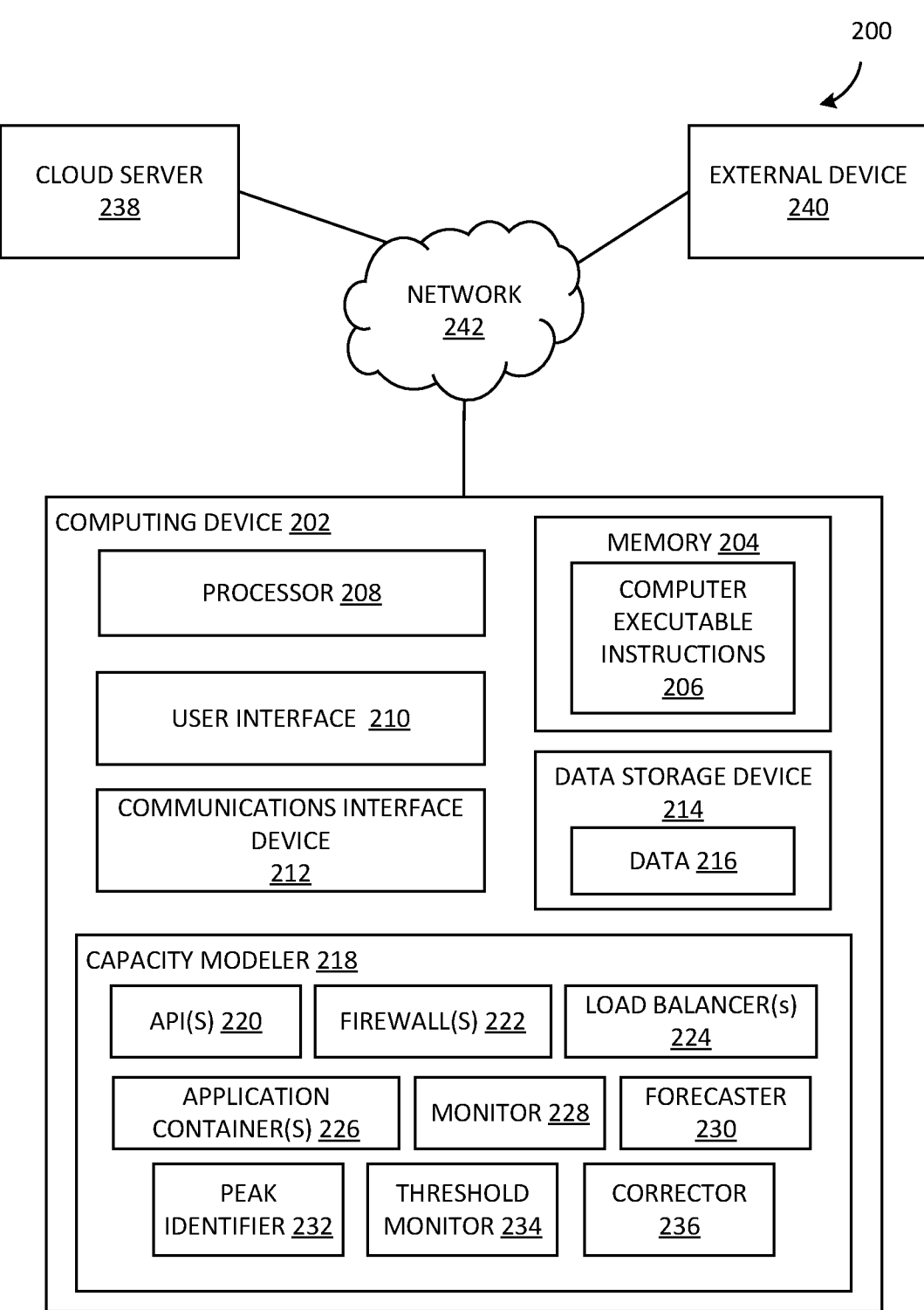
FIG. 2 is a block diagram illustrating an example system for capacity tracking and forecast modeling across multiple platforms.

FIG. 2 is a block diagram illustrating an example system for capacity tracking and forecast modeling across multiple platforms. The system 200 illustrated in FIG. 2 is provided for illustration only. Other examples of the system 200 can be used without departing from the scope of the present disclosure. In some examples, the system 200 includes one or more components of the system 100, including the data sources 102, data 106, and processing environment 108.

The system 200 includes a computing device 202, a cloud server 238, and an external device 240. Each of the computing device 202, the external device 240, and the cloud server 238 are communicatively coupled to and communicate via a network 242. The computing device 202 represents any device executing computer-executable instructions 206 (e.g., as application programs, operating system functionality, or both) to implement the operations and functionality associated with the computing device 202. The computing device 202, in some examples, is a device executed in the cloud. In some examples, the computing device 202 includes a mobile computing device or any other portable device. A mobile computing device can include servers, desktop computers, kiosks, IoT devices, or tabletop devices. Additionally, the computing device 202 can represent a group of processing units or other computing devices.

In some examples, the computing device 202 is an example of the processing environment 108. In some examples, the computing device 202 includes at least one processor 208, a memory 204 that includes the computer-executable instructions 206, and a user interface 210. The processor 208 includes any quantity of processing units, including but not limited to a CPU or units, a graphics processing unit (GPU) or units, and a neural processing unit (NPU) or units. The processor 208 is programmed to execute the computer-executable instructions 206. The computer-executable instructions 206 are performed by the processor 208, performed by multiple processors within the computing device 202, or performed by a processor external to the computing device 202. In some examples, the processor 208 is programmed to execute computer-executable instructions 206 such as those illustrated in the figures described herein. In various examples, the processor 208 is configured to execute one or more of the communications interface device 212, data storage device 214, and capacity modeler 218 as described in greater detail below. In other words, the communications interface device 212, data storage device 214, and capacity modeler 218 are implemented on and/or by the processor 208.

The memory 204 includes any quantity of media associated with or accessible by the computing device 202. The memory 204 in these examples is internal to the computing device 202, as illustrated in FIG. 2. In other examples, the memory 204 is external to the computing device 202 or both internal and external to the computing device 202. For example, the memory 204 can include both a memory component internal to the computing device 202 and a memory component external to the computing device 202. The memory 204 stores data, such as one or more applications. The applications, when executed by the processor 208, operate to perform various functions on the computing device 202. The applications can communicate with counterpart applications or services, such as web services accessible via the network 242. In an example, the applications represent downloaded client-side applications that correspond to server-side services executing in a cloud, such as the cloud server 238.

The user interface 210 includes a graphics card for displaying data to a user and receiving data from the user. The user interface 210 can also include computer-executable instructions, for example a driver, for operating the graphics card. Further, the user interface 210 can include a display, for example a touch screen display or natural user interface, and/or computer-executable instructions, for example a driver, for operating the display. In some examples, the user interface 210 presents a notification, or alert, recommending a corrective action be taken, as described in greater detail herein, that is generated by the corrector 236.

The communications interface device 212 includes a network interface card and/or computer-executable instructions, such as a driver, for operating the network interface card. Communication between the computing device 202 and other devices, such as but not limited to the cloud server 238, can occur using any protocol or mechanism over any wired or wireless connection. In some examples, the communications interface device 212 is operable with short range communication technologies such as by using NFC tags or RFID.

The computing device 202 further includes a data storage device 214 for storing data, such as, but not limited to data 216. The data storage device 214, in this example, is included within the computing device 202, attached to the computing device 202, plugged into the computing device 202, or otherwise associated with the computing device 202. In other examples, the data storage device 214 includes a remote data storage accessed by the computing device 202 via the network 242, such as a remote data storage device, a data storage in a remote data center, or a cloud storage.

In some examples, the data 216 is an example of the data 106. In some examples, the data 216 is data associated with a request that is received by the computing device 202, such as a request received from an external device 240 via the network 242. In other words, the external device 240 may be an example of a data source 102 illustrated in FIG. 1. The data 216 may include transaction details, including the purchaser, seller, transaction amount, a time stamp, product details that were purchased, and so forth, as well as details regarding the request so that the proper components are called to process the request.

The computing device 202 further includes a capacity modeler 218. In some examples, the capacity modeler 218 is an example of the processing environment 108 illustrated in FIG. 1. The capacity modeler 218 includes one or more APIs 220, one or more firewalls 222, one or more load balancers 224, and one or more application containers 226 which may be called throughout a data flow, such as the data flow 110, to process and execute a request. For example, the API 220 may be the API 112, the firewall 222 may be the firewall 114, the load balancer 224 may be the load balancer 116, and the application container 226 may be the application container 118. The capacity modeler 218 further includes a monitor 228, a forecaster 230, a peak identifier 232, a threshold monitor 234, and a corrector 236. In some examples, the monitor 228 is the monitor 120, the forecaster 230 is the forecaster 122, the peak identifier 232 is the peak identifier 123, the threshold monitor 234 is the threshold monitor 124, and the corrector 236 is the corrector 128.

Figure 3:
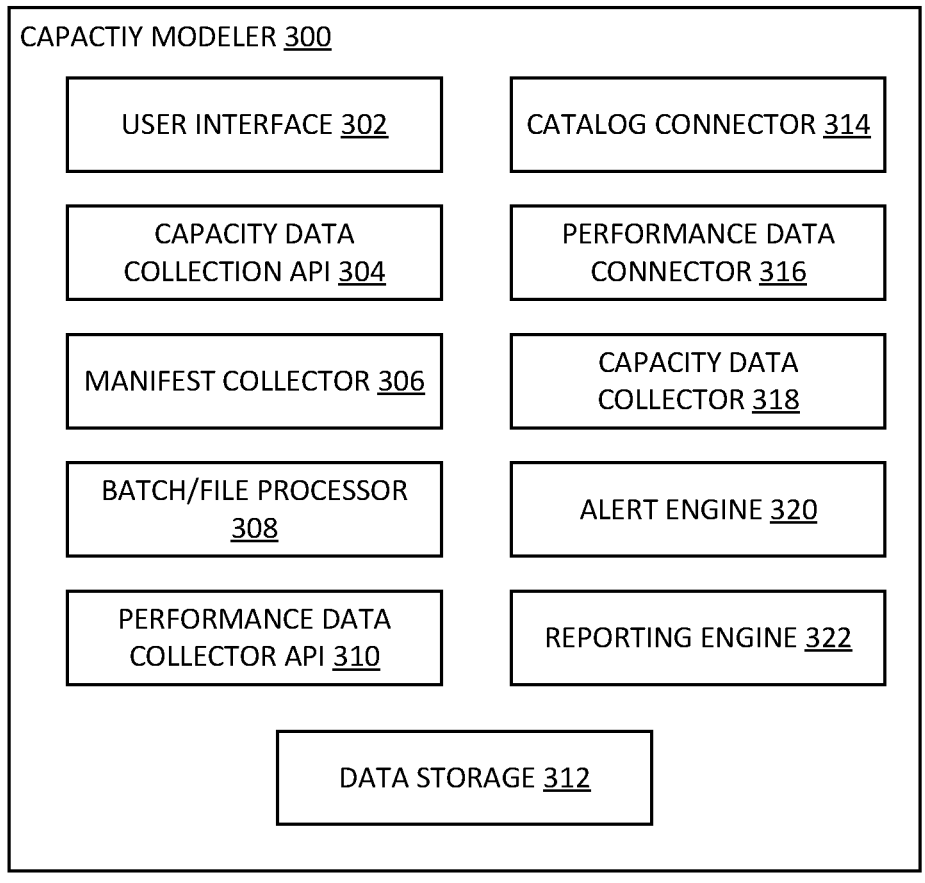
FIG. 3 is a block diagram illustrating a capacity modeler for capacity tracking and forecast modeling across multiple platforms.

FIG. 3 is a block diagram illustrating a capacity modeler for capacity tracking and forecast modeling across multiple platforms. The capacity modeler 300 illustrated in FIG. 3 is provided for illustration only. Other examples of the capacity modeler 300 can be used without departing from the scope of the present disclosure. In some examples, the capacity modeler 300 is an example of the capacity modeler 218 illustrated in FIG. 2.

The capacity modeler 300 is an example of the capacity modeler 218. The capacity modeler 300 includes a user interface 302, a capacity data collection API 304, a manifest collector 306, a batch/file processor 308, and a performance data collector API 310 which receive data from various components and push the data to the capacity modeler. The user interface 302 may be an example of the user interface 210. For example, the user interface 302 may be used by a user to access the capacity modeler 300, such as via an application or a web browser. The capacity data collection API 304 is an example of an API 220 and collects capacity data. For example, the capacity data collection API 304 may receive data from one or more of an application performance monitor (APM) system, a hardware capacity monitor system, and a database monitor system. In some examples, the capacity data collection API 304 is implemented by the monitor 120 to monitor data traffic and/or by the peak identifier 123 to determine current peak usage and peak capacity for each component in the data flow 110 as described herein.

The manifest collector 306 is an example of an API 220 and receives data from generate infrastructure provisioning systems and a configuration management database (CMDB). In other words, the manifest collector 306 receives data from management systems and is implemented to assist with the monitoring and management of access to infrastructure provisioning systems and databases.

The batch/file processor 308 may be a specialized computing processor implemented on the processor 208 that receives legacy systems and file transfers. The batch/file processor 308 receives data from file systems and the transfer of files as part of the data flow 110.

The performance data collector API 310 is an example of an API 220 and receives data associated with performance testing of different components through performance test tools. For example, the performance data collector API 310 is implemented by the peak identifier 123 to determine and/or validate the peak capacity of respective components in the data flow 110, such as the APIs 112, firewalls 114, load balancers 116, and application containers 118.

The capacity modeler 300 further includes data storage 312. The data storage 312 is an example of the data storage device 214 and includes one or more databases or data lakes. The data storage 312 stores data related to data flows 110, data that is retrieved in response to received queries, the log that is generated and maintained by the monitor 120, and so forth.

The capacity modeler 300 further includes a catalog connector 314, a performance data connector 316, a capacity data collector 318, an alert engine 320, and a reporting engine 322, each of which obtains, or pulls, data from various components. For example, the catalog connector 314, performance data connector 316, capacity data collector 318, alert engine 320, and reporting engine 322 can periodically pull a refresh of respective data. The catalog connector 314 is a specialized computing processor implemented on the processor 208 that obtains data from a central customer catalog, central service catalog, and CMDB. In some examples, the central customer catalog, central service catalog, and CMDB are included in or associated with the data storage 312.

The performance data connector 316 is a specialized computing processor implemented on the processor 208 that obtains data from a performance test repository, which stores data associated with the performance testing of the system. This data is used by the peak identifier 232 to determine the peak capacity and current peak usage for each component in the data flow 110.

The capacity data collector 318 is a specialized computing processor implemented on the processor 208 that obtains data from the APM system, the hardware capacity monitor system, and database repositories. This data is used by the monitor 228 to monitor the current resource usage and available capacity.

The alert engine 320 is a specialized computing processor implemented on the processor 208 that obtains data from enterprise alerting tools. The corrector 236 uses the data obtained from the enterprise alerting tools to present an alert, via the user interface 302 or transmitted to the external device 240, of a corrective action to take place based on the first threshold 126a being reached, the second threshold 126b being reached, or both the first threshold 126a and the second threshold 126b being reached, for at least one component in the data flow 110.

The reporting engine 322 is a specialized computing processor implemented on the processor 208 that obtains data from enterprise reporting capabilities. In some examples, the data obtained from the enterprise reporting includes performance metrics of different systems or components involved in the data flow 110. For example, the data from the enterprise reporting may include capacity data and/or usage data that is included in the log generated and maintained by the monitor 228.

Figure 4:
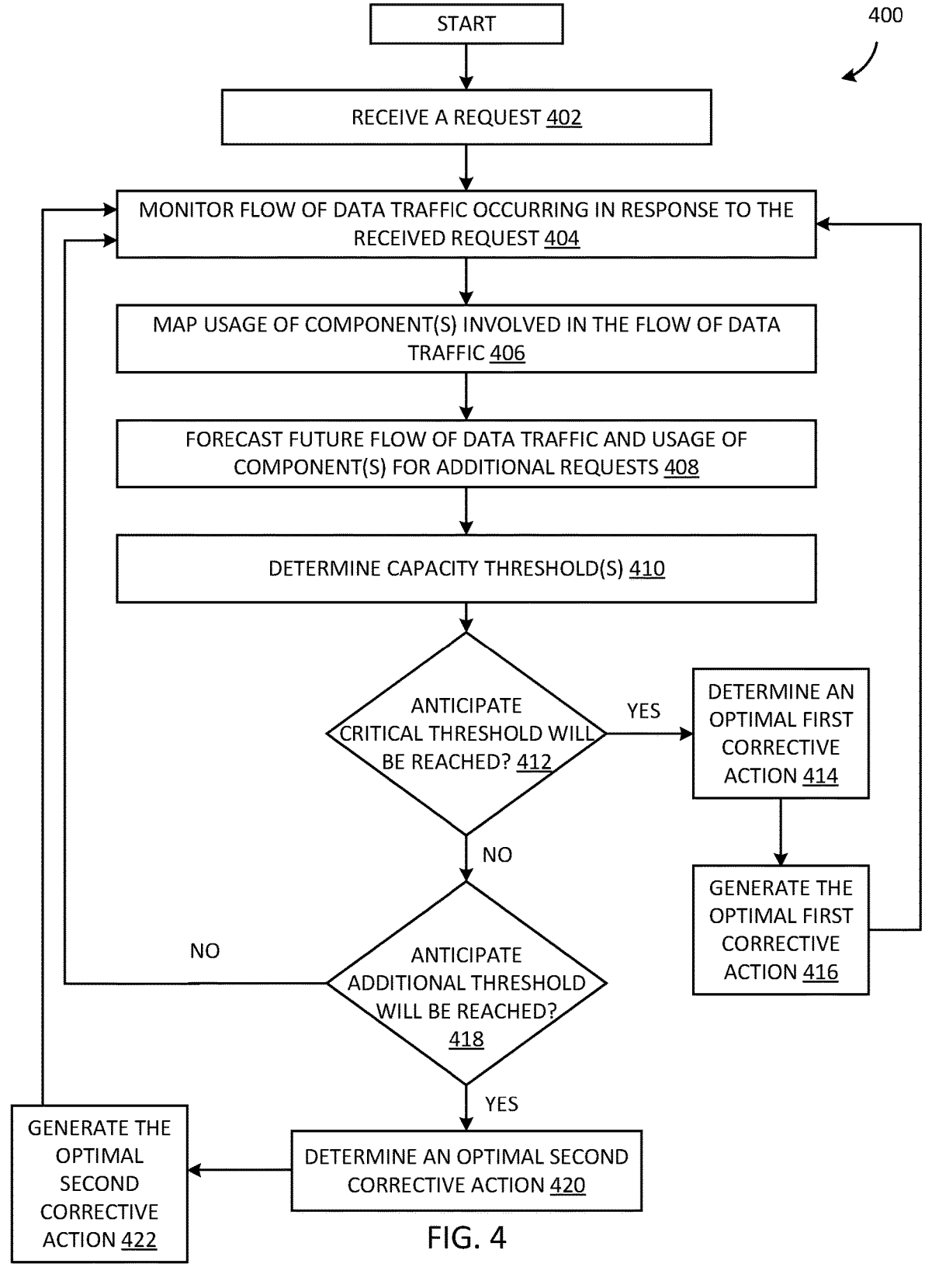
FIG. 4 is an example computerized method of capacity tracking and forecast modeling across multiple platforms.

FIG. 4 is an example computerized method of capacity tracking and forecast modeling across multiple platforms. The method 400 illustrated in FIG. 4 is for illustration only. Other examples of the method 400 may be used without departing from the scope of the present disclosure. The method 400 may be implemented by one or more components of the system 100 illustrated in FIG. 1, the system 200 illustrated in FIG. 2, or the capacity modeler 300 illustrated in FIG. 3, such as the components of the example computing device 1100 described in greater detail below in the description of FIG. 11.

The method 400 begins by the processing environment 108 receiving a request from a data source 102 in operation 402. In some examples, the request is a request to process a transaction. In some examples, the request is a request to process a return or a refund. In some examples, the request is a query to return data stored in the data storage device 214, such as a database or a data lake. However, other examples are possible and the request may be any type of request processed by the processing environment 108. The request includes the data 106. In examples where the request is a request to process a transaction, return, or refund, the data 106 includes transaction details, including the purchaser, seller, transaction amount, a time stamp, product details that were purchased, and so forth, as well as details regarding the request so that the proper components are called to process the request. In examples where the request is a query to retrieve data from the data storage device 214, the data 106 includes details regarding the data to be retrieved, details regarding where the data is stored, and so forth.

Figure 5:
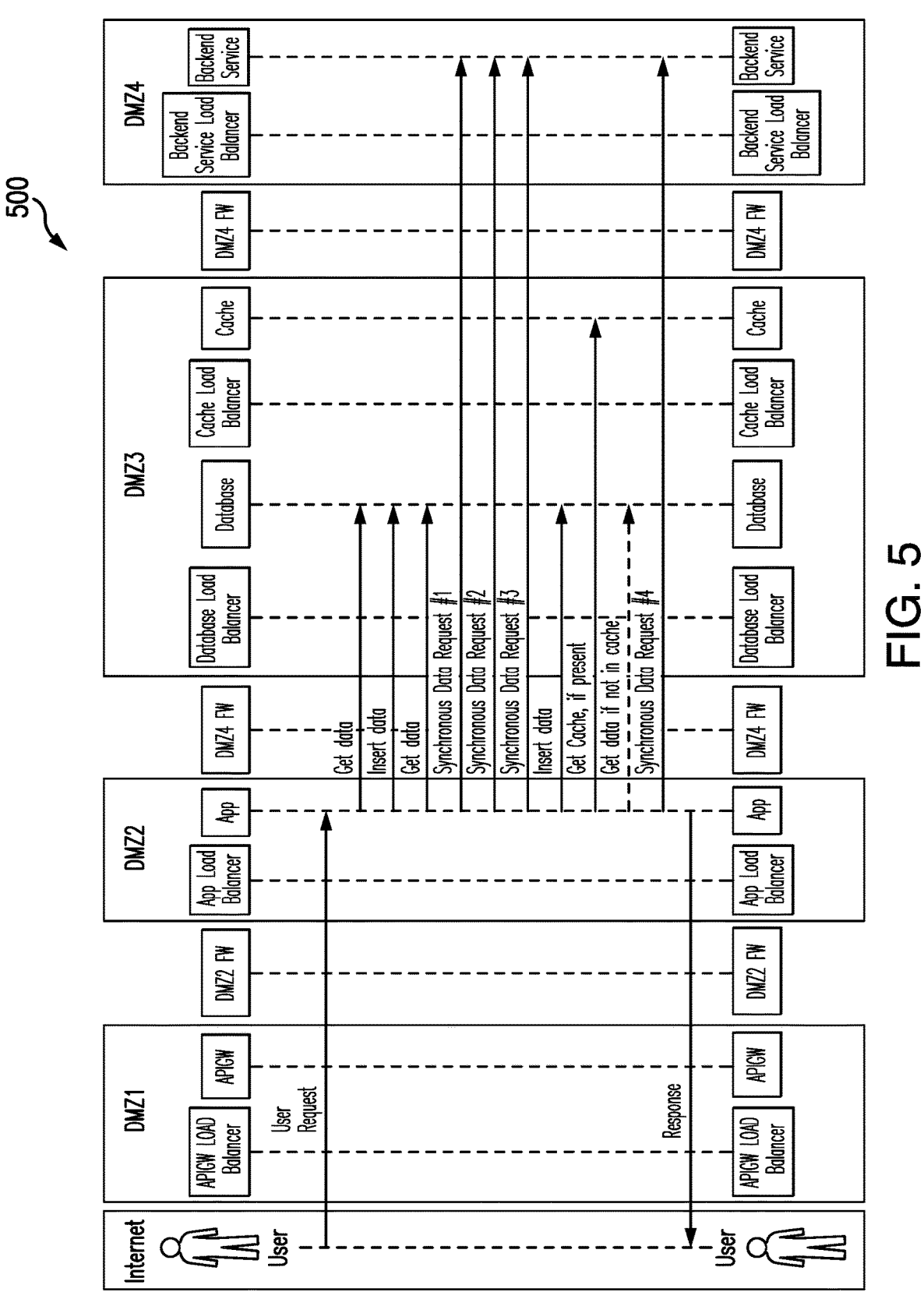
FIG. 5 is an example flow of data traffic for a request.

In operation 404, the monitor 120 monitors the flow of data traffic through the data flow 110 that occurs in response to the received request. For example, FIG. 5 illustrates an example flow 500 of data traffic occurring in response to a received request. The monitor 120 monitors this data flow and, in operation 406, maps the usage of the various components involved in the flow of the data traffic.

For example, FIG. 5 illustrates a request received from a user via the internet, which is an example of the network 242. Between the user and the application, the request, such as an API POST request, traverses a shared physical API Gateway load balancer 116, a shared API Gateway 112, a shared physical firewall 114, a physical application load balancer 116, and then the application container 118. The application container 118 then calls a database, which may be an example of the data storage device 214 or the data storage 312 and requires traversal of a shared physical firewall 114 and database load balancer 116 to access at each invocation, to get data from the database, insert data into the database, and again get data from the database. The application container 118 calls a cryptography service, such as a backend service. For example, the backend service may be a dependent shared cryptography service to decrypt data, encrypt data, and sign the data. The application container 118 inserts the signed data into the database, calls a cache to retrieve data, retrieves the data from the database if the data is not present in the cache, encrypts the retrieved data via the backend service, and then returns a response to the request initially received in operation 402.

This flow 110 of data traffic is monitored in operation 404 and mapped in operation 406. It should be understood that although described herein as occurring in separate operations, operations 404 and 406 may be executed concurrently. For example, the data flow 110 may be mapped as the flow is monitored.

In some examples, mapping the usage of the components involved in the flow 110 of data traffic for a particular request includes generating and maintaining a log of components called, or invoked, in the data flow of the request. For example, FIG. 6 illustrates an example table 600 showing component usage for the request and expected component usage for additional requests. The table 600 is an example of the log generated and maintained by the monitor 120. The first row of the table 600 includes a list of components called in the data flow 110 for the particular request. For example, the table 600 includes components APIGW load balancer, APIGW, DMZ2 firewall (FW), APP load balancer, App, DMZ3 FW, Database load balancer, Database, Cache load balancer, Cache, DMZ4 FW, backend service load balancer, and backend service. The second row of the table 600 defines the number of hits per use case, i.e., the number of calls, or invocations, of each component during the data flow 110 for the particular request. As shown in FIG. 6, for the request illustrated in FIG. 5, each of the APIGW load balancer, APIGW, DMZ2 FW, APP load balancer, App, Cache load balancer, and Cache are called one time each, the DMZ3 FW is called ten times, the database load balancer and database are each called five times, and the DMZ4 FW, backend service load balancer, and backend service are each called four times.

In operation 408, the forecaster 122 forecasts a future flow of data traffic and usage of components for additional requests. In some examples, the forecaster 122 extrapolates the mapped usage for a single request by simulating an increase in number of requests to generate values for future modeled usage. For example, where the hits per use case in the table 600 is defined for a single request, such as a transaction, the forecaster 122 simulates an increase of 100 transactions per second (TPS) and multiplies the hits per use case of a single request by 100 for each respective component listed in the table 600. The forecaster 122 adds a new row to the table 600 labeled with future/modeled TPS and populates the cells for each component with the forecasted usage. As shown in the table 600, the forecaster 122 populates the new row with one hundred calls of each of the APIGW load balancer, APIGW, DMZ2 FW, APP load balancer, App, Cache load balancer, and Cache, one thousand calls of the DMZ3 FW, five hundred calls of each of the database load balancer and database, and four hundred calls of each of the DMZ4 FW, backend service load balancer, and backend service.

In operation 410, capacity thresholds are determined by the peak identifier 123. The peak identifier 123 determines the peak capacity usage for each respective component in the data flow 110. In the example illustrated in FIGS. 5 and 6, the peak capacity for each of the APIGW load balancer, APIGW, DMZ2 FW, APP load balancer, App, DMZ3 FW, Database load balancer, Database, Cache load balancer, Cache, DMZ4 FW, backend service load balancer, and backend service is determined by the peak identifier 123. For example, the peak identifier 123 determines the current peak usage and peak capacity for each of the APIGW load balancer, APIGW, DMZ2 FW, APP load balancer, App, DMZ3 FW, Database load balancer, Database, Cache load balancer, Cache, DMZ4 FW, backend service load balancer, and backend service and updates the table 600 to include new rows that recite the current peak usage and peak capacity TPS. As shown in the table 600, the current peak usage for each component refers to actual peak usage that has been observed on each component within the lookback window, while the peak capacity TPS refers to an upper limit of known capacity of the component validated, for example, by data received by the capacity data collection API 304.

In operation 412, the threshold monitor 124 anticipates whether a critical threshold will be reached for any of the components in the flow 110 of data traffic for the request based on the forecast increase in data traffic. In some examples, the critical threshold is the second threshold 126b. When the critical threshold is anticipated to be reached, anticipated resource usage is greater than the calculated peak capacity for the respective component. In examples where the threshold monitor 124 anticipates the critical threshold will be reached for at least one of the components, the method 400 proceeds to operation 414. In examples where the threshold monitor 124 does not anticipate the critical threshold will be reached for at least one of the components, the method 400 proceeds to operation 416.

In operation 414, the corrector 128 determines an optimal first corrective action. As described herein, the corrective action includes one or more of limiting the rate at which the data flow 110 progresses, throttling the processing power allocated to the respective components, scaling the available capacity to increase the capacity of the respective component, changing a request path, i.e., the data flow 110 among the respective components, generating a notification that is transmitted or presented to take a corrective action, and so forth. In some examples, the optimal corrective action is determined based on which corrective action would provide a greatest net benefit. For example, changing a request path may result in the critical threshold not being reached for the particular data flow 110 but would disrupt other examples of the data flow 110 that would ultimately result in less benefit than another corrective action, such as rate limiting at processing power throttling. Thus, in some examples the corrector 128 performs an analysis to determine the optimal corrective action. In some examples, performing the analysis includes executing a configurable rule that depends on what component or infrastructure is flagged as reaching the capacity threshold. For example, the corrective action can include generating an alert for an operator to manually review and take corrective action, integrating with a platform-specific management engine to spin up additional virtual machine infrastructure to proactively warm up before too much traffic is encountered, or enabling a throttle/rate-limiter on other components that were deemed lower priority to preserve finite processing power. The corrective action further enables the simulation of weak spots based on different inputs, including both forecast inputs and actual inputs, so that action can be taken proactively before the threshold is actually reached.

In operation 416, the corrector 128 generates and applies, or controls to apply, the determined optimal first corrective action. Following the execution of operation 416, the method 400 returns to operation 404 and continues monitoring the flow of data traffic.

In some examples, a threshold may be identified for multiple components in the data flow 110. For example, as shown in table 600, the critical threshold is identified as anticipated to be reached for each of the application, the DMZ3 FW, the DMZ4 FW, and the backend service. In some examples, a single corrective action may be generated that addresses the anticipated reaching of the critical threshold for each of the application, the DMZ3 FW, the DMZ4 FW, and the backend service. In other examples, multiple corrective actions are generated in order to address the anticipated reaching of the critical threshold for different components. Thus, in some examples operation 416 includes generating more than first corrective action.

In operation 418, the threshold monitor 124 anticipates whether an additional threshold will be reached for any of the components in the flow 110 of data traffic for the request based on the forecast increase in data traffic. In some examples, the additional threshold is the first threshold 126a, i.e., a warning threshold. When the additional threshold is anticipated to be reached, anticipated resource usage reaches a predetermined percentage of the calculated peak capacity for the respective component. In examples where the threshold monitor 124 anticipates the additional threshold will be reached for at least one of the components, the method 400 proceeds to operation 420. In examples where the threshold monitor 124 does not anticipate the additional threshold will be reached for at least one of the components, the method 400 returns to operation 404 and continues monitoring the flow of data traffic.

In operation 420, the corrector 128 determines an optimal second corrective action. As described herein, the corrective action includes one or more of limiting the rate at which the data flow 110 progresses, throttling the processing power allocated to the respective components, scaling the available capacity to increase the capacity of the respective component, changing a request path, i.e., the data flow 110 among the respective components, generating a notification that is transmitted or presented to take a corrective action, and so forth. In some examples, the particular corrective action that is generated is selected based on which corrective action would provide a greatest net benefit. For example, changing a request path may result in the critical threshold not being reached for the particular data flow 110 but would disrupt other examples of the data flow 110 that would ultimately result in less benefit than another corrective action, such as rate limiting at processing power throttling. Thus, in some examples the corrector 128 performs an analysis to determine the optimal corrective action. In operation 422, the corrector 128 generates and applies, or controls to apply, the determined optimal second corrective action. Following the execution of operation 422, the method 400 returns to operation 404 and continues monitoring the flow of data traffic.

In some examples, a threshold may be identified for multiple components in the data flow 110. For example, as shown in table 600, the warning threshold is identified as anticipated to be reached for each of the APIGW, Database, and Cache. In some examples, a single corrective action may be generated that addresses the anticipated reaching of the critical threshold for each of the APIGW, Database, and Cache. In other examples, multiple corrective actions are generated in order to address the anticipated reaching of the critical threshold for different components. Thus, in some examples operation 422 includes generating more than second corrective action.

It should be understood that although described herein as two separate operations performed one after another, operations 416 and 422 may be performed in any order or performed simultaneously. For example, operation 416 may be performed prior to operation 422 in order to prioritize thresholds that are critical and threaten the stability of the system 100. In another example, operation 422 may be performed prior to operation 416 in order to identify mitigating corrective actions that may be taken to stabilize the system 100 without corrective action to the degree of generating the first corrective action. In another example, operations 416 and 422 are performed simultaneously in order to identify each threshold, whether critical or warning, that is anticipated to be reached based on a forecasted increase in data traffic.

In some examples, the first and second corrective actions are the same action, but executed to different degrees. For example, the second corrective action may be to throttle the processing power allocated to the respective components to slow the data flow 110, while the first corrective action may be to provide a greater amount of throttling to the processing power allocated to the respective components to slow the data flow 110 more than is slowed by the second corrective action. In some examples, the first and second corrective actions are different actions. For example, the second corrective action may be to throttle the processing power allocated to the respective components to slow the data flow 110, while the first corrective action may be to change the request path.

It should be understood that the method 400 may be used in various implementations. The various implementations presented herein may be used in isolation or in combination with other implementations. In one example, the method 400 is implemented to define a customer subtype usage and/or frequency of units of work. For example, the customer subtype includes seasonal patterns, marketing campaigns, recurring billing, monthly billing, and so forth. The particular customer subtype usage depends on an internal application on which the method 400 is implemented. For example, where the internal application is a payment processing application, the forecasted usage is likely to increase at or around early December, i.e., in advance of the holiday season, and return to a baseline following the holiday season.

In some examples, the method 400 is implemented to define a customer identifier, such as a wallet identifier, a client identifier, a token requester identifier, or another indicator. In other words, the method 400 may be implemented to define particular usage for a particular customer, rather than a general increase in usage.

In another example, the method 400 is implemented to define database record modeling per measurement of workloads. The workload may be measured in TPS, requests per second (RPS), and so forth. The measurement of the workload includes CPU bandwidth, I/O bandwidth, storage capacity, memory capacity, and connection pooling along with cost and known thresholds which database query performance will degrade over time with use.

The method 400 may be further implemented to model new workloads as references to measurements of workloads on the system, such as TPS, RPS, and so forth. In this example, the method 400 is implemented to determine future scenarios and an overall impact to the entire ecosystem and transaction flow.

In some examples, the method 400 is implemented to quantify financial costs of estimates, sometimes with a linkage to a central infrastructure repository. For example, the financial cost of 1,000 additional TPS may result in a direct cost of, e.g., $100,000, additional infrastructure needed to stabilize the system for the additional TPS. In some examples, the central infrastructure repository may be the CMDB.

In some examples, the method 400 is implemented to define the measurement of demand on the system, such as TPS, RPS, and so forth. The measurement of demand may be expressed in multiple dimensions, such as TPS relative to a number of cards, or a combination of different types of workloads across components. In other examples, the method 400 is implemented to define interfaces to map a user journey, i.e., a data flow, including firewalls, load balancers, shared services, database, Java Virtual Machine (JVM), containers, dependent systems, and so forth, along with a number of interactions a user journey has with each component. For example, a user journey may call the database 4 times, call a shared service 7 times, traverse 2 firewalls, and so forth.

The method 400 may be further implemented to plug in or retrieve actual usage of metrics from existing systems over time to demonstrate actual trends across all interfaces (including peak usage), in addition to which new forecasts may be added. In other examples, the method 400 is implemented to plug in performance test results to identify upcoming bottlenecks or a deeper feedback loop between performance test results or defining new performance tests to run.

In some examples, the method 400 is implemented to showcase actual resource usage vs. forecast resource usage to improve forecasting models. For example, the method 400 may be implemented to highlight situations where 1,000 TPS is forecast and funded, but only ten TPS are ultimately seen, which provides objective feedback to product owners.

In some examples, the method 400 is implemented to designate defined components as fixed capacity or scalable along with defining scaling limits where applicable. In other examples, the method 400 is implemented to define and incorporate hardware utilization, such as CPU, memory, disk, network, and so forth. In still other examples, the method 400 is implemented to capture component and/or application workload statistics, such as heap, garbage collection, CPU time, application requests per second, and so forth.

In some examples, the method 400 is implemented to export data and/or results for specific timeframes into reports or presentation materials for communicating findings outside of the capacity modeler, such as heat graphs, line charts, and so forth. In another example, the method 400 is implemented to self-determine based on historic data or manually define growth rate, (forecast), organic, product and cyclical against each workload measurement. In yet another example, the method 400 is implemented to define customer types, such as a catalog product that is used. For example, a customer type may be a recurring billing customer compared to an online retailer.

Figure 7:
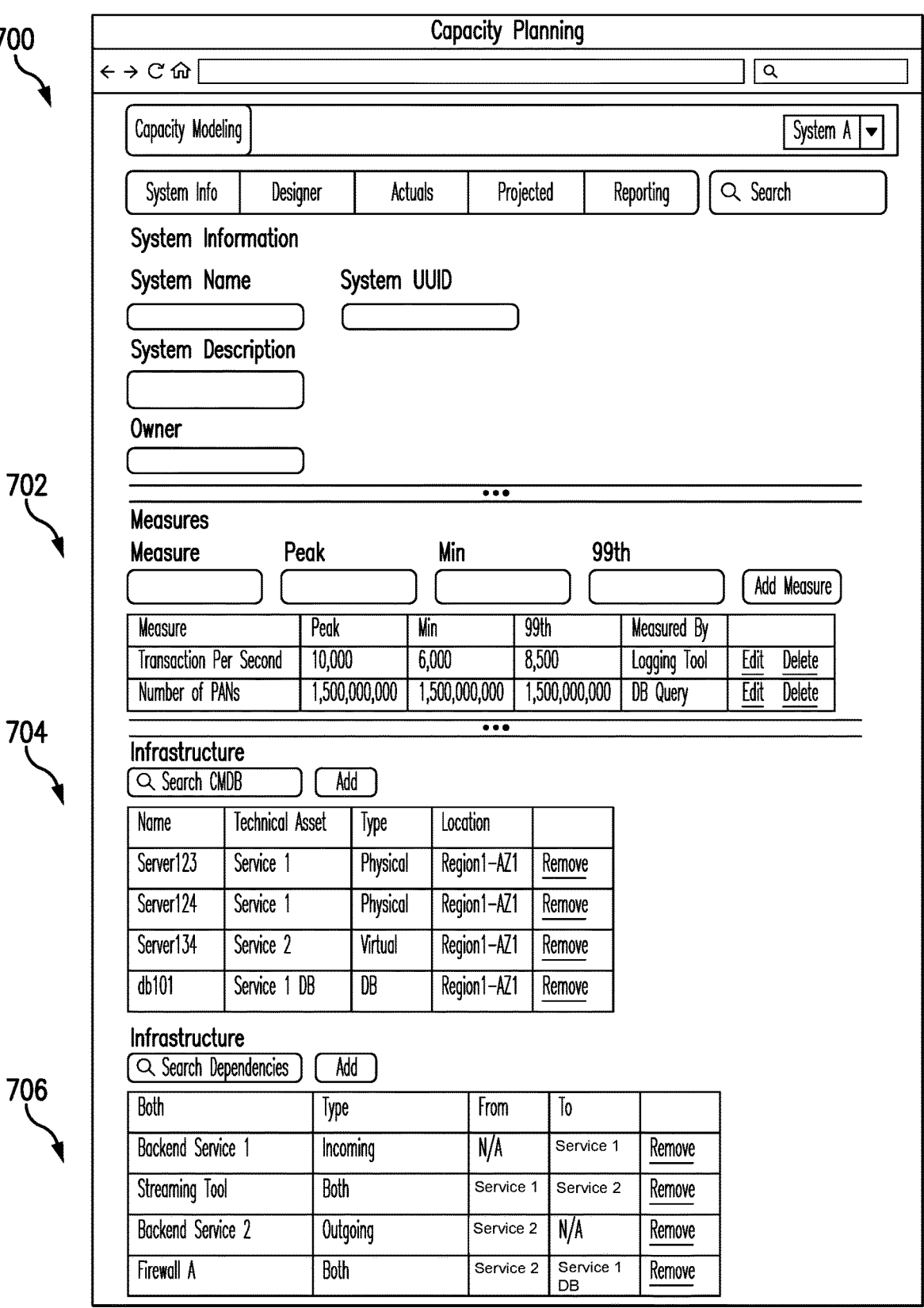
FIG. 7 is an example user interface (UI) for capacity tracking and forecast modeling across multiple platforms.

FIG. 7 is an example user interface (UI) for capacity tracking and forecast modeling across multiple platforms. The UI 700 illustrated in FIG. 7 is provided for illustration only. Other examples of the UI 700 can be used without departing from the scope of the present disclosure. In some examples, the UI 700 is an example of the UI 210 and the UI 302.

The UI 700 is an example UI wireframe operable to receive inputs that generate the forecasted future flow of data traffic for one or more requests. In some examples, the UI 700 is operable to receive inputs that enter metadata, measurement information, infrastructure, and shared dependencies. As shown in FIG. 7, the UI 700 includes options to enter parameters related to measures 702, infrastructure 704, and dependencies 706 to enable robust modeling and forecasting of traffic through one or more data flows 110. In some examples, the UI 700 is presented responsive to the selection of the "system info" tab of the capacity modeling UI.

The parameters for the measures 702 include a measure, a peak, a minimum, a maximum, and how the measure is measured. As shown in the example UI 700, the measure may include transactions per second (TPS) or number of personal area networks (PANs). The peak is an example of the peak capacity illustrated in the table 600. The minimum and maximum refer to minimum and maximum parameters of the measure. In the UI 700, the TPS measure is measured by a logging tool while the number of PANs measure is measured by number of database queries. The measures 702 further includes selectable options to add a new measure including each of the aforementioned parameters, edit the parameters for a particular measure, and delete a particular measure.

The parameters for the infrastructure 704 include a name, a technical asset, a type, and a location. The name refers to a particular example of an infrastructure, such as a server, a database, and so forth. The technical asset refers to the type of asset which the example infrastructure is. The type refers to whether the example infrastructure is physical, virtual, and so forth. The location refers to where the example infrastructure is located.

The parameters for the dependencies 706 define the dependency or dependencies for a particular forecast model. The parameters include both a type of dependency and where the dependency traverses to and from. Examples of "both" illustrated in the UI 700 include a backend service 1, a streaming tool, a backend service 2, and firewall A. A type refers to whether the dependency is incoming, outgoing, or both. "From" and "to" refer to where the dependency is going to and from in the data flow 110.

Figure 8:
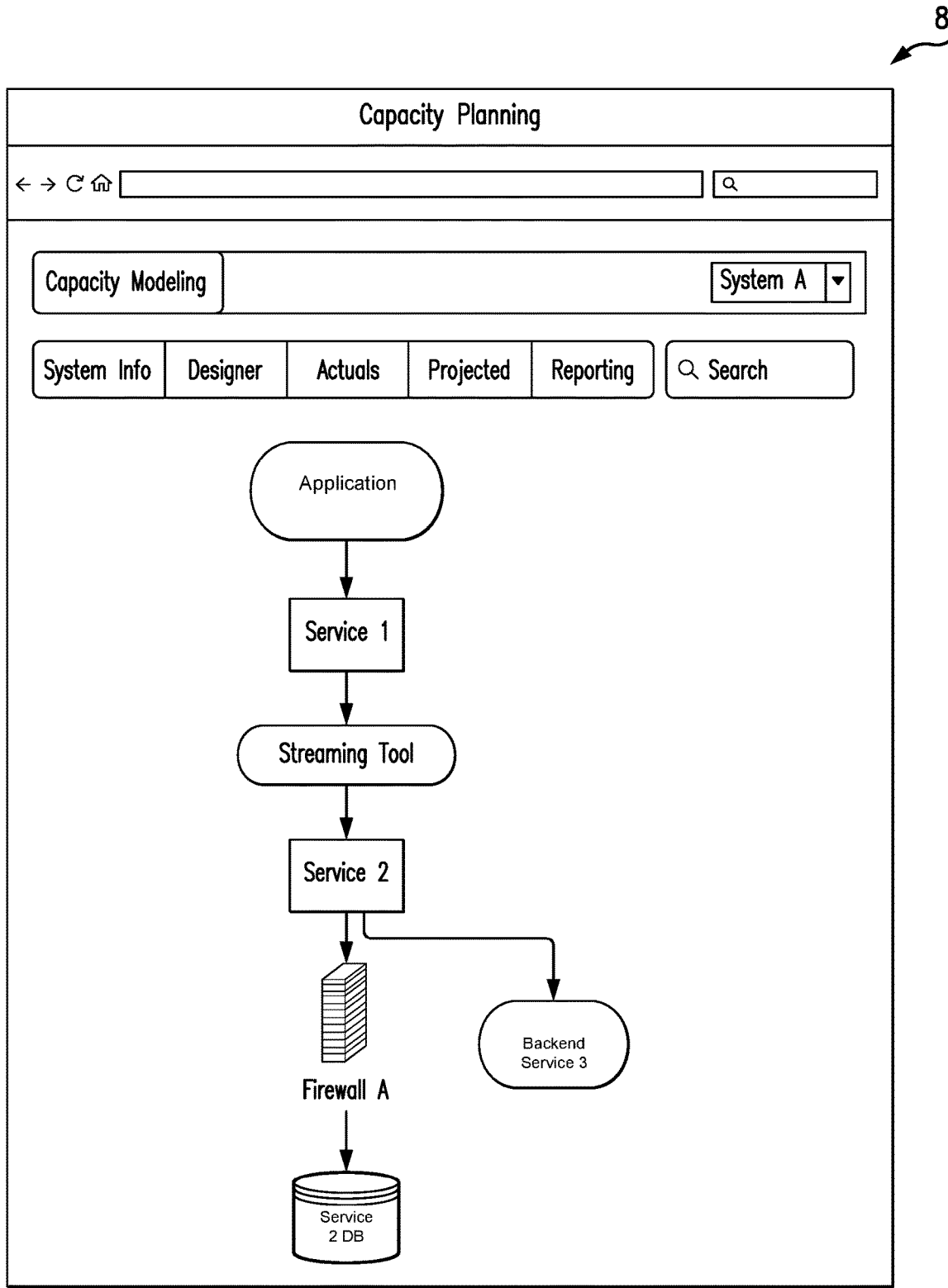
FIG. 8 is an example UI for capacity tracking and forecast modeling across multiple platforms.

FIG. 8 is an example UI for capacity tracking and forecast modeling across multiple platforms. The UI 800 illustrated in FIG. 8 is provided for illustration only. Other examples of the UI 800 can be used without departing from the scope of the present disclosure. In some examples, the UI 800 is an example of the UI 210 and the UI 302. In some examples, the UI 800 is presented responsive to the selection of the "designer" tab of the capacity modeling UI.

The UI 800 is an example UI wireframe that presents a visual depiction of dependency mapping. For example, the UI 800 enables a drag-and-drop method of mapping dependencies of different data flows, enabling the incorporation of various capacity models across an entire ecosystem. For example, in the UI 800, the components of the backend service 1, streaming tool, and backend service 3 indicate shared components outside of the scope of a particular application, while the Service 1, Service 2, and Service 2 DB represent specific application components. In other words, the UI 800 enables shared components to be brought into the dependency mapping through a received input, in addition to the components of a particular application. As such, additional dependencies, i.e., additional, tangential data flows that are executed due to the original data flow, are considered in the forecast generated by the capacity modeler, improving the accuracy of the forecast such that data flows are considered in their entirety rather than in isolation. This further improves the operation of the system by improving the forecast to more precisely identify critical and warning thresholds that are to be reached based on various parameters, allowing corrective actions to be proactively generated and applied to stabilize processing systems.

Figure 9B:
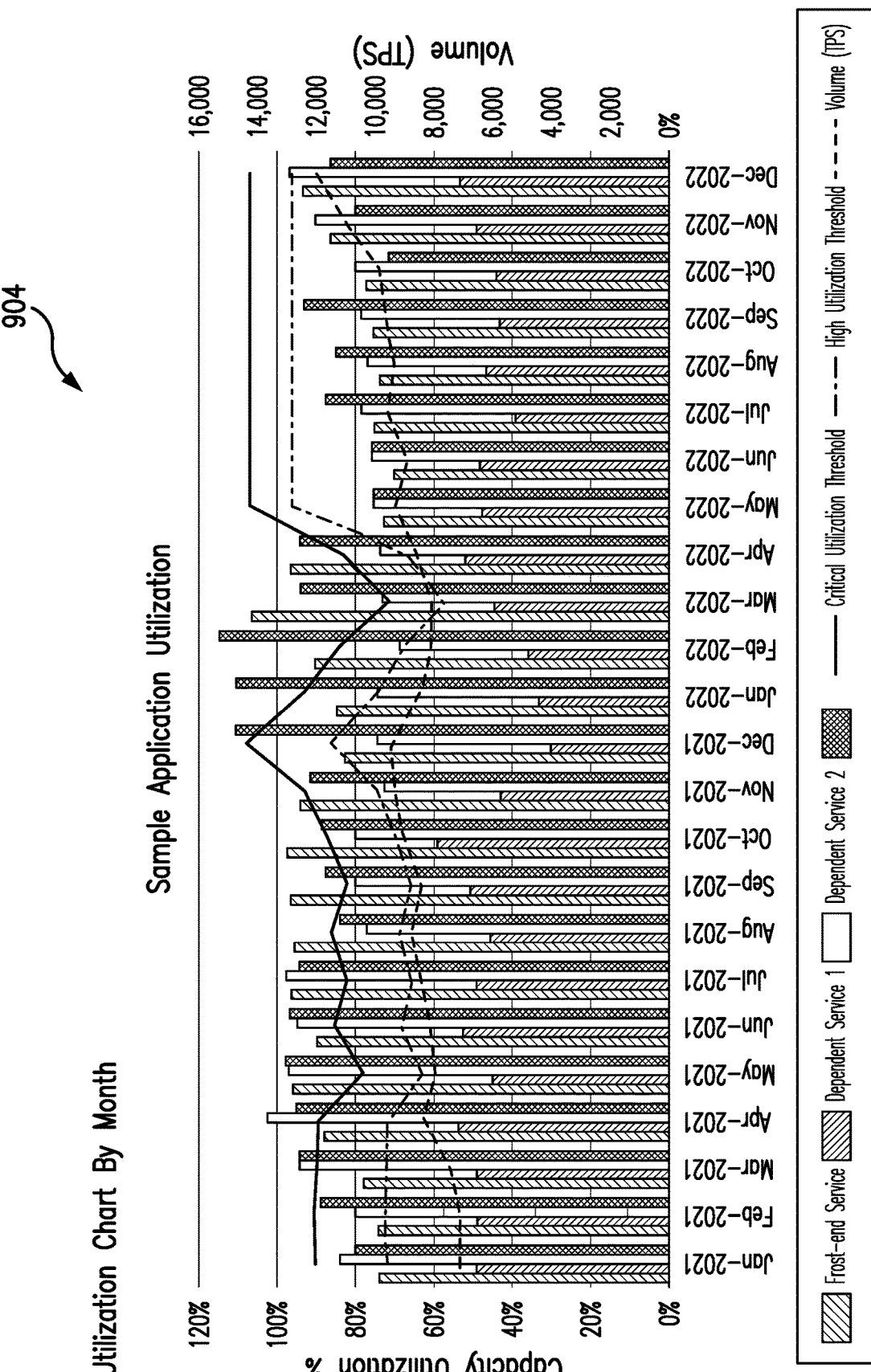

FIGS. 9A and 9B are examples of a UI presenting a utilization heat map by month and utilization chart by month. The UIs illustrated in FIGS. 9A and 9B are provided for illustration only. Other examples of the UI can be used without departing from the scope of the present disclosure. In some examples, the UI is an example of the UI 210 and the UI 302. In some examples, the UI is presented responsive to the selection of the "reporting" tab of the capacity modeling UI.

FIG. 9A illustrates a UI including a first heat map 902 that is a utilization heat map by month, while FIG. 9B illustrates a UI including a second heat map 904 is presented as a chart that includes the same historical and predicted usage as presented in the first heat map 902, but in a chart format. The first heat map 902 is presented as a table that includes both historical usages, illustrated in FIG. 9A as January 2021 through September 2022, and predicted usages, illustrated in FIG. 9B as October 2022 through December 2022, of utilization metrics. The predicted usages are based on the forecasted modeling, such as the forecasted relationships between demand capacity. In some examples, the first heat map 902 is color coded to highlight areas that reached, in the case of historical usage, either the first threshold or the second threshold or are anticipated to reach, in the case of predicted usage, either the first threshold or the second threshold.

The second heat map 904 illustrated in FIG. 9B is a utilization chart by month. The second heat map 904 is presented as a chart that includes the same historical and predicted usage as presented in the first heat map 902, but in a chart format. In some examples, the first heat map 902 and the second heat map 904 are presented on a single UI where each of the first heat map 902 and the second heat map 904 are visible together. In some examples, the first heat map 902 and the second heat map 904 are presented separately such that only one of the first heat map 902 and the second heat map 904 are visible at a time.

In some examples, based on the results presented on the UI illustrated in FIG. 9A, FIG. 9B, or both, a corrective action or actions may be generated. In some examples, based on the results presented on the UI, the UI 700 or the UI 800 may be returned to in order to generate additional forecasts that take into account various corrective actions, such as changing a data flow path 110 or changing minimum or maximum parameters.

Figure 10:
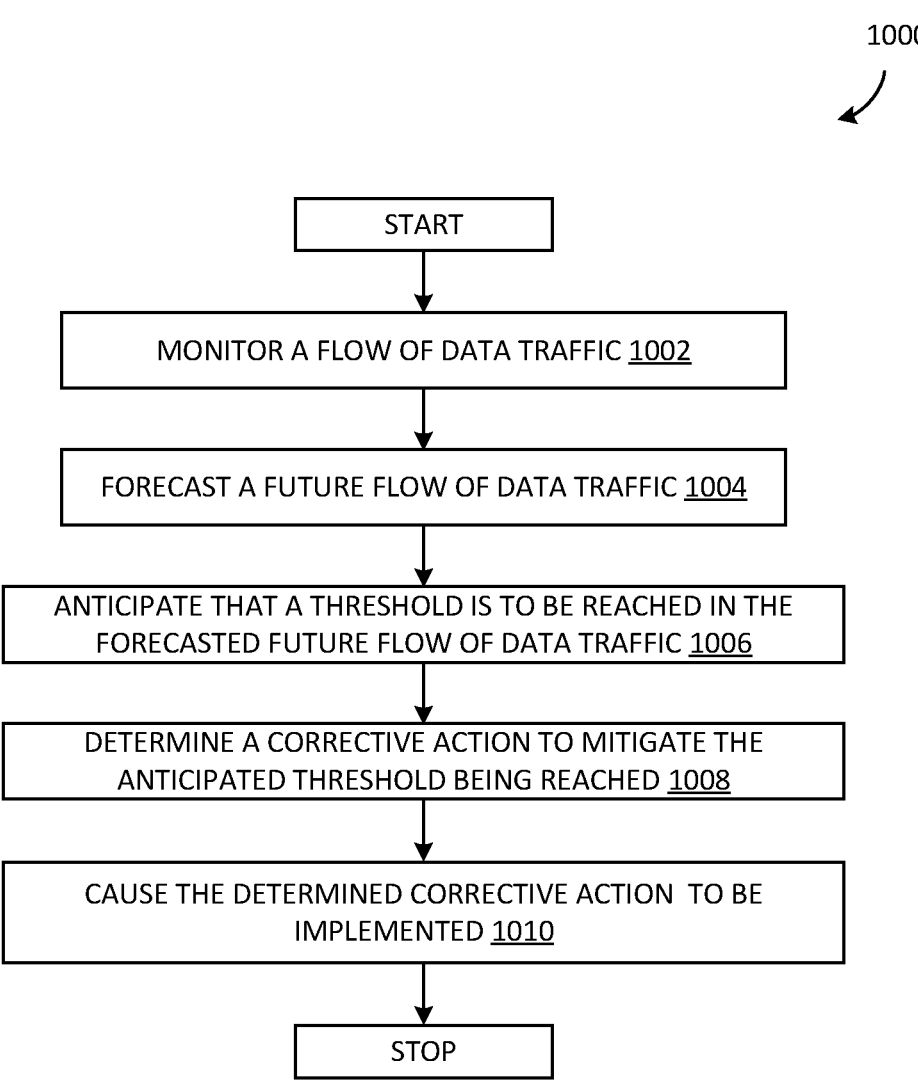
FIG. 10 is an example computerized method of capacity tracking and forecast modeling.

FIG. 10 is an example computerized method of capacity tracking and forecast modeling. The method 1000 illustrated in FIG. 10 is for illustration only. Other examples of the method 1000 may be used without departing from the scope of the present disclosure. The method 1000 may be implemented by one or more components of the system 100 illustrated in FIG. 1, the system 200 illustrated in FIG. 2, or the capacity modeler 300 illustrated in FIG. 3, such as the components of the example computing device 1100 described in greater detail below in the description of FIG. 11.

The method 1000 begins by the monitor 120 monitoring a flow of data traffic from a first device to a second device in operation 1002. In some examples, the flow of data traffic is from an external device, such as the data source 102, to the processing environment 108. In this example, the data source 102 is the first device and the processing environment 108 is the second device. In some examples, the monitored flow of data traffic is in response to a request and includes a response to the request. In some examples, monitoring the flow of data traffic includes mapping the usage of the components involved in the flow 110 of data traffic for a particular request and defining a measurement of a workload. Mapping the usage of the components includes logging the number of calls, or invocations, to each of various components in the flow of data traffic, which enables the measurement of the workload of each respective component. In some examples, the flow of data traffic includes one or more of traversing an application programming interface (API) gateway, traversing a firewall, traversing a load balancer, and traversing an application container on the second device.

In some examples, monitoring the flow of data traffic includes identifying a subtype usage or frequency of units involved traversed for the received request. In some examples, monitoring the flow of data traffic includes identifying a customer identifier associated with the received request. In some examples, monitoring the flow of data traffic includes identifying downstream requests that are processed in the flow of data traffic in response to the received request. In some examples, the monitor 120 defines an interface that maps the flow of data traffic. In some examples, the flow of data traffic is monitored in response to receiving a query. A flow history for particular API requests is generated for the flow of data traffic for the particular request and the generated, or obtained, flow history for the API request is stored, such as in the data storage device 214 as an example of data 216.

In operation 1004, the forecaster 122 forecasts a future flow of data traffic based on the flow history for the particular request. The forecasted future flow of data traffic includes additional data traffic in addition to the monitored flow of data traffic originally monitored in operation 1002. In some examples, the forecaster 122 extrapolates the mapped usage for a single request by simulating an increase in number of requests to generate values for future modeled usage. For example, where the hits per use case in the table 600 is defined for a single request, such as a transaction, the forecaster 122 simulates an increase of 100 transactions per second (TPS) and multiplies the hits per use case of a single request by 100 for each respective component listed in the table 600. In some examples, forecasting the future flow of data traffic includes determining capacity thresholds. The peak identifier 123 determines the peak capacity usage for each respective component in the data flow 110.

In operation 1006, the threshold monitor 124 anticipates that one of the first threshold 126a or the second threshold 126b is to be reached in the forecasted future flow of data traffic. In some examples, the first threshold 126a indicates a warning threshold level and the second threshold 126b indicates a critical threshold level. The critical threshold level is an indication that resource usage exceeds a peak capacity for a particular component in the forecasted future flow of data traffic, while the warning threshold level is an indication that resource usage reaches a predetermined percentage of the peak capacity for the particular component in the forecasted future flow of data traffic. For example, anticipating that the first threshold 126a is to be reached includes anticipating that resource usage for a component in the flow of data traffic, based on the forecasted future flow of data traffic, reaches a predetermined percentage of peak capacity for the component, and anticipating that the second threshold 126b is to be reached includes anticipating that resource usage for the component in the flow of data traffic, based on the forecasted future flow of data traffic, exceeds the peak capacity for the component.

In operation 1008, the corrector 128 determines an optimal corrective action to be generated and applied to mitigate the anticipated threshold level being reached. In some examples, the corrective action includes one or more of adding additional capacity, adjusting the flow of data traffic, limiting a rate of the flow of data traffic, or pausing the flow of data traffic. The optimal corrective action is determined based on which corrective action would provide a greatest net benefit. For example, changing a request path may result in the critical threshold not being reached for the particular data flow 110 but would disrupt other examples of the data flow 110 that would ultimately result in less benefit than another corrective action, such as rate limiting at processing power throttling.

In operation 1010, the corrector 128 causes, or initiates, the determined corrective action to be implemented to proactively prevent the anticipated threshold from being reached. In other words, the corrective action is implemented prior to the threshold being reached in order to mitigate the likelihood that the threshold is reached in the event that the resources are used in line with the forecasted model. For example, the corrector 128 sends a signal, via the network 242, indicating the determined corrective action to be taken to a computing device, such as the cloud server 238 or the external device 240, that then implements the determined corrective action.

Example Operating Environment

Figure 11:
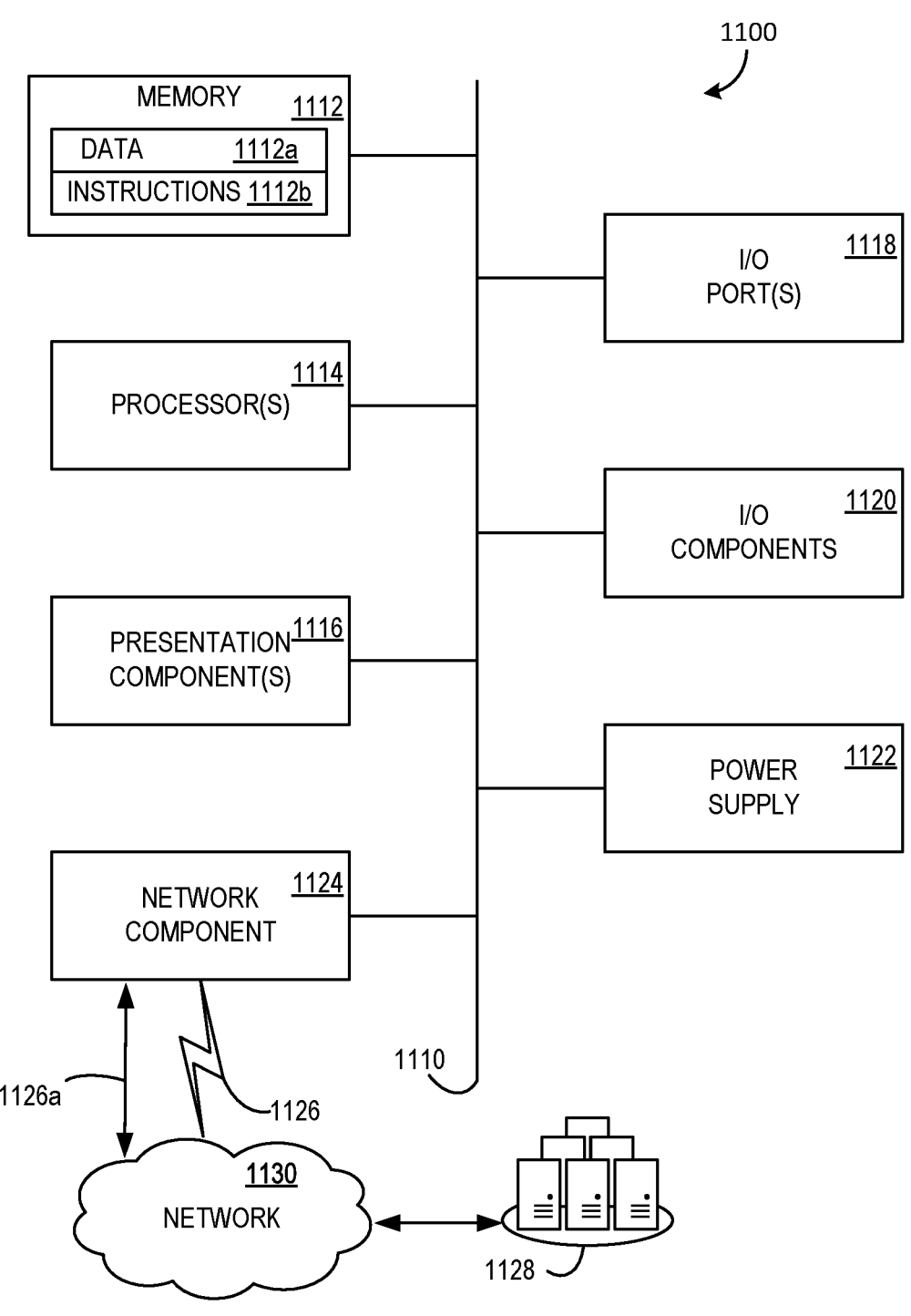
FIG. 11 is a block diagram of an example computing device for implementing implementations of the present disclosure.

FIG. 11 is a block diagram of an example computing device 1100 for implementing aspects disclosed herein and is designated generally as computing device 1100. Computing device 1100 is an example of a suitable computing environment and is not intended to suggest any limitation as to the scope of use or functionality of the examples disclosed herein. Neither should computing device 1100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

In some examples, the computing device 1100 is the computing device 202. Accordingly, the memory 1112, the processor 1114, the presentation component(s) 1116, and the network 1130 can be the memory 204, the processor 208, the user interface 210, and the network 242, respectively. However, these examples should not be construed as limiting. Various examples are possible.

Computing device 1100 includes a bus 1110 that directly or indirectly couples the following devices: computer-storage memory 1112, one or more processors 1114, one or more presentation components 1116, I/O ports 1118, I/O components 1120, a power supply 1122, and a network component 1124. While computing device 1100 is depicted as a seemingly single device, multiple computing devices 1100 may work together and share the depicted device resources. For example, memory 1112 may be distributed across multiple devices, and processor(s) 1114 may be housed with different devices.

Bus 1110 represents what may be one or more busses (such as an address bus, data bus, or a combination thereof). Although the various blocks of FIG. 11 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 11 and the references herein to a "computing device." Memory 1112 may take the form of the computer storage media references below and operatively provide storage of computer-readable instructions, data structures, program modules and other data for computing device 1100. In some examples, memory 1112 stores one or more of an operating system, a universal application platform, or other program modules and program data. Memory 1112 is thus able to store and access data 1112a and instructions 1112b that are executable by processor 1114 and configured to carry out the various operations disclosed herein.

In some examples, memory 1112 includes computer storage media in the form of volatile and/or nonvolatile memory, removable or non-removable memory, data disks in virtual environments, or a combination thereof. Memory 1112 may include any quantity of memory associated with or accessible by computing device 1100. Memory 1112 may be internal to computing device 1100, external to computing device 1100, or both. Examples of memory 1112 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1100. Additionally, or alternatively, memory 1112 may be distributed across multiple computing devices 1100, for example, in a virtualized environment in which instruction processing is carried out on multiple computing devices 1100. For the purposes of this disclosure, "computer storage media," "computer-storage memory," "memory," and "memory devices" are synonymous terms for computer-storage memory 1112, and none of these terms include carrier waves or propagating signaling.

Processor(s) 1114 may include any quantity of processing units that read data from various entities, such as memory 1112 or I/O components 1120 and may include CPUs and/or GPUs. Specifically, processor(s) 1114 are programmed to execute computer-executable instructions for implementing aspects of the disclosure. The instructions may be performed by the processor, by multiple processors within computing device 1100, or by a processor external to client computing device 1100. In some examples, processor(s) 1114 are programmed to execute instructions such as those illustrated in the in the accompanying drawings. Moreover, in some examples, processor(s) 1114 represent an implementation of analog techniques to perform the operations described herein. For example, the operations may be performed by an analog client computing device 1100 and/or a digital client computing device 1100. Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways. I/O ports 1118 allow computing device 1100 to be logically coupled to other devices including I/O components 1120, some of which may be built in. Example I/O components 1120 include, for example but without limitation, a microphone, joystick, game pad, satellite dish, scanner, printer, wireless device, etc.

Computing device 1100 may operate in a networked environment via network component 1124 using logical connections to one or more remote computers. In some examples, network component 1124 includes a network interface card and/or computer-executable instructions (e.g., a driver) for operating the network interface card. Communication between computing device 1100 and other devices may occur using any protocol or mechanism over any wired or wireless connection. In some examples, network component 1124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1124 communicates over wireless communication link 1126 and/or a wired communication link 1126a to a cloud resource 1128 across network 1130. Various different examples of communication links 1126 and 1126a include a wireless connection, a wired connection, and/or a dedicated link, and in some examples, at least a portion is routed through the internet.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some examples, a computer-implemented method includes monitoring a flow of data traffic from a first device to a second device; forecasting a future flow of data traffic based on the monitored flow, the future flow of data traffic including additional data traffic in addition to the monitored flow of data traffic; anticipating that a threshold is to be reached in the forecasted future flow of data traffic; determining a corrective action to mitigate the anticipated threshold being reached; and causing the determined corrective action to be implemented, the corrective action proactively preventing the anticipated threshold from being reached.

In some examples, a system includes a processor, a memory communicatively coupled to the processor, and a capacity modeler implemented on the processor. The capacity modeler monitors a flow of data traffic from a first device to a second device; forecasts a future flow of data traffic based on the monitored flow, the future flow of data traffic including additional data traffic in addition to the monitored flow of data traffic; anticipates that a threshold is to be reached in the forecasted future flow of data traffic; determines a corrective action to mitigate the anticipated threshold being reached; and initiates the determined corrective action, the corrective action proactively preventing the anticipated threshold from being reached.

In some examples, a computer-storage medium stores instructions that, when executed by a processor, cause the processor to monitor a flow of data traffic from a first device to a second device; forecast a future flow of data traffic based on the monitored flow, the future flow of data traffic including additional data traffic in addition to the monitored flow of data traffic; anticipate that a threshold is to be reached in the forecasted future flow of data traffic; determine a corrective action to mitigate the anticipated threshold being reached; and initiate the determined corrective action, the corrective action proactively preventing the anticipated threshold from being reached.

Alternatively, or in addition to the other examples described herein, examples include any combination of the following:

wherein the generated corrective action includes one or more of adding additional capacity, adjusting the flow of data traffic, limiting a rate of the flow of data traffic, or pausing the flow of data traffic;

wherein the threshold includes a first threshold indicating a warning threshold level and a second threshold indicating a critical threshold level, wherein the critical threshold level is a higher threshold level than the warning threshold level;

wherein the critical threshold level is an indication that resource usage exceeds a peak capacity for a particular component in the forecasted future flow of data traffic;

wherein the warning threshold level is an indication that resource usage reaches a predetermined percentage of the peak capacity for the particular component in the forecasted future flow of data traffic;

wherein anticipating that the first threshold is to be reached further comprises anticipating that resource usage for a component in the flow of data traffic, based on the forecasted future flow of data traffic, reaches a predetermined percentage of peak capacity for the component;

wherein anticipating that the second threshold is to be reached further comprises anticipating that resource usage for the component in the flow of data traffic, based on the forecasted future flow of data traffic, exceeds the peak capacity for the component;

wherein causing the corrective action to be implemented further comprises causing a first corrective action to be implemented based on the anticipation that the first threshold is to be reached in the forecasted future flow of data traffic, and causing a second corrective action to be implemented based on the anticipation that the second threshold is to be reached in the forecasted future flow of data traffic;

wherein the first corrective action is different than the second corrective action;

wherein the flow of data traffic includes one or more of traversing an application programming interface (API) gateway, traversing a firewall, traversing a load balancer, and traversing an application container on the second device;

wherein the corrective action is implemented prior to the threshold being reached;

wherein monitoring the flow of data traffic further comprises identifying a subtype usage or frequency of units involved traversed in the monitored flow of data traffic;

wherein monitoring the flow of data traffic further comprises identifying a customer identifier associated with a received request that initiates the monitored flow of data traffic;

wherein monitoring the flow of data traffic further comprises identifying downstream requests that are processed in the flow of data traffic;

defining a measurement of a workload based on the monitored flow of data traffic;

defining an interface that maps the flow of data traffic;

wherein forecasting the future flow of data traffic further comprises extrapolating the monitored flow of data traffic through the flow of data traffic mapped by the defined interface;

receiving a query, the query initiating the monitored flow of data traffic, and forecasting the future flow of data traffic for the received query based on the monitored flow; and causing the corrective action to be applied to mitigate a likelihood that the threshold is reached based on the forecasted future flow of data traffic.

While no personally identifiable information is tracked by aspects of the disclosure, examples have been described with reference to data monitored and/or collected from the users.

In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above.

Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A computer-implemented method comprising:

monitoring a flow of data traffic from a first device comprising a data source to a second device comprising a processing environment;

forecasting a future flow of data traffic based on the monitored flow by mapping the monitored flow of the monitored data traffic to a communication path between the first device and the second device, the communication path comprising a first component and a second component communicatively coupled to the first device and the second device, the first component and the second component each having a mapped usage to process the data traffic in the monitored flow of the data traffic between the first device and the second device, each of the first component and the second component comprising an application programming interface (API), a firewall, a load balancer, an application container, a shared service, a database, a gateway, a virtual machine, or a dependent system, the future flow of data traffic including additional data traffic in addition to the monitored flow of data traffic, and forecasting the future flow of data traffic further comprising using the mapping to model a future capacity usage of the first component and the second component;

based on the modeled future capacity usage of the first component and the second component, anticipating that a threshold is to be reached by at least one of the first component or the second component in the forecasted future flow of data traffic;

determining a corrective action to mitigate the anticipated threshold being reached by at least one of the first component or the second component;

causing the determined corrective action to be implemented, the corrective action proactively preventing the anticipated threshold from being reached by at least one of the first component or the second component; and based on implementing the determined corrective action, stabilizing the first device and the second device with respect to the flow of data traffic during a surge in the data traffic.

2. The computer-implemented method of claim 1, wherein the corrective action includes one or more of:

adding additional capacity to at least one of the first component or the second component, the adding comprising scaling an available capacity of the first component or the second component, adjusting the flow of data traffic, limiting a rate of the flow of data traffic, and pausing the flow of data traffic.

3. The computer-implemented method of claim 1, wherein the threshold includes a first threshold indicating a warning threshold level and a second threshold indicating a critical threshold level, wherein the critical threshold level is a higher threshold level than the warning threshold level.

4. The computer-implemented method of claim 3, wherein:

the critical threshold level is an indication that a resource usage of a resource associated with the first component or the second component exceeds a peak capacity for the first component or the second component in the forecasted future flow of data traffic, the resource comprising a processor, a memory, a network bandwidth, a computing processing resource, or a processing resource; and the warning threshold level is an indication that the resource usage of the resource associated with the first component or the second component reaches a predetermined percentage of the peak capacity for the first component or the second component in the forecasted future flow of data traffic.

5. The computer-implemented method of claim 3, wherein:

anticipating that the first threshold is to be reached further comprises anticipating that a resource usage for the first component or the second component in the flow of data traffic, based on the forecasted future flow of data traffic, reaches a predetermined percentage of peak capacity for the first component or the second component; and anticipating that the second threshold is to be reached further comprises anticipating that the resource usage for the first component or the second component in the flow of data traffic, based on the forecasted future flow of data traffic, exceeds the peak capacity for the first component or the second component.

6. The computer-implemented method of claim 5, wherein causing the corrective action to be implemented comprises:

causing a first corrective action to be implemented based on the anticipation that the first threshold is to be reached in the forecasted future flow of data traffic by the first component or the second component;

causing a second corrective action to be implemented based on the anticipation that the second threshold is to be reached in the forecasted future flow of data traffic by the first component or the second component; and wherein the first corrective action is different than the second corrective action.

7. The computer-implemented method of claim 1, wherein the flow of data traffic includes traversing the application container on the second device.

8. The computer-implemented method of claim 1, wherein the corrective action is implemented prior to the threshold being reached by the first component or the second component.

9. The computer-implemented method of claim 1, wherein monitoring the flow of data traffic further comprises identifying a subtype usage involved in or frequency of units traversed in the monitored flow of data traffic and forecasting the future flow of the data traffic is further based on the identified subtype usage or the identified frequency of units.

10. The computer-implemented method of claim 1, wherein monitoring the flow of data traffic further comprises identifying a customer identifier associated with a received request that initiates the monitored flow of data traffic.

11. The computer-implemented method of claim 1, wherein monitoring the flow of data traffic further comprises identifying a downstream request that is processed in the flow of data traffic in response to a request received by the first device or the second device.

12. The computer-implemented method of claim 1, further comprising:

defining a measurement of a workload based on the monitored flow of data traffic; and the determined corrective action being an optimal corrective action, the optimal corrective action determined to provide a greatest net benefit to the flow of data traffic.

13. The computer-implemented method of claim 1, further comprising:

defining an interface that maps the flow of data traffic; and forecasting the future flow of the data traffic further comprising extrapolating the monitored flow of data traffic through the flow of data traffic mapped by the defined interface.

14. The computer-implemented method of claim 1, further comprising:

receiving, by the second device a query from the first device;

responding, by the second device, to the query from the first device, the responding initiating the monitored flow of data traffic; and forecasting the future flow of data traffic for the received query based on the monitored flow.

15. The computer-implemented method of claim 1, further comprising:

a capacity of the first component or the second component having a scaling limit; and determining the corrective action being based in part on the scaling limit of the first component or the second component.

16. A system comprising:

a processor;

a memory communicatively coupled to the processor; and a capacity modeler, implemented on the processor, that:

monitors a flow of data traffic from a first device comprising a data source to a second device comprising a processing environment;

forecasts a future flow of data traffic based on the monitored flow, by mapping the monitored flow of the monitored data traffic to a communication path between the first device and the second device, the communication path comprising a first component and a second component communicatively coupled to the first device and the second device, the first component and the second component each having a mapped usage to process the data traffic in the monitored flow of the data traffic between the first device and the second device, each of the first component or the second component comprising an application programming interface (API), a firewall, a load balancer, an application container, a shared service, a database, a gateway, a virtual machine, or a dependent system, the future flow of data traffic including additional data traffic in addition to the monitored flow of data traffic, and forecasting the future flow of data traffic further comprising using the mapping to model a future capacity usage of the first component or the second component;

based on the modeled future capacity usage of the first component or the second component, anticipates that a threshold is to be reached by the first component or the second component in the forecasted future flow of data traffic;

determines a corrective action to mitigate the anticipated threshold being reached by the first component or the second component;

initiates the determined corrective action, the corrective action proactively preventing the anticipated threshold from being reached; and based on initiating the determined corrective action, stabilizing the first device and the second device with respect to the flow of data traffic during a surge in the data traffic.

17. The system of claim 16, the threshold further comprising a first threshold indicating a warning threshold level and a second threshold indicating a critical threshold level, the critical threshold level being a higher threshold level than the warning threshold level.

18. The system of claim 17, wherein:

to anticipate that the first threshold is to be reached, the capacity modeler further anticipates that a resource usage for the first component or the second component in the flow of data traffic, based on the forecasted future flow of data traffic, reaches a predetermined percentage of peak capacity for the first component or the second component; and to anticipate that the second threshold is to be reached, the capacity modeler further anticipates that the resource usage for the first component or the second component in the flow of data traffic, based on the forecasted future flow of data traffic, exceeds the peak capacity for the first component or the second component.

19. The system of claim 18, wherein, to initiate the corrective action, the capacity modeler further:

identifies a first corrective action based on the anticipation that the first threshold is to be reached in the forecasted future flow of data traffic by the first component or the second component;

identifies a second corrective action based on the anticipation that the second threshold is to be reached in the forecasted future flow of data traffic by the first component or the second component; and wherein the first corrective action is different than the second corrective action.

20. A non-transitory computer-storage medium storing instructions that, when executed by a processor, cause the processor to:

monitor a flow of data traffic from a first device comprising a data source to a second device comprising a processing environment;

forecast a future flow of data traffic based on the monitored flow by mapping the monitored flow of the monitored data traffic to a communication path between the first device and the second device, the communication path comprising a first component and a second component communicatively coupled to the first device and the second device, each of the first component and the second component having a mapped usage to process the data traffic in the monitored flow of the data traffic between the first device and the second device, the first component or the second component comprising an application programming interface (API), a firewall, a load balancer, an application container, a shared service, a database, a gateway, a virtual machine, or a dependent system, the future flow of data traffic including additional data traffic in addition to the monitored flow of data traffic, and forecasting the future flow of data traffic further comprising using the mapping to model future capacity usage of the first component or the second component;

based on the modeled future capacity usage of the first component or the second component, anticipate that a threshold is to be reached by the first component or the second component in the forecasted future flow of data traffic;

determine a corrective action to mitigate the anticipated threshold being reached by the first component or the second component;

initiate the determined corrective action, the corrective action proactively preventing the anticipated threshold from being reached; and based on initiating the determined corrective action, stabilizing the first device and the second device with respect to the flow of data traffic during a surge in the data traffic.

* * * * *